United States Patent
Kim et al.

(10) Patent No.: US 12,047,444 B2
(45) Date of Patent: Jul. 23, 2024

(54) ELECTRONIC DEVICE AND METHOD FOR RECORDING AUDIO DATA ACQUIRED FROM MULTIPLE DEVICES

(71) Applicant: Samsung Electronics Co., Ltd., Gyeonggi-do (KR)

(72) Inventors: Hyunwook Kim, Gyeonggi-do (KR); Sanghoon Lee, Gyeonggi-do (KR); Hyunchul Yang, Gyeonggi-do (KR); Hangil Moon, Gyeonggi-do (KR); Kali Charangajula, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/837,229

(22) Filed: Jun. 10, 2022

(65) Prior Publication Data
US 2022/0353330 A1 Nov. 3, 2022

Related U.S. Application Data

(63) Continuation of application No. PCT/KR2022/004849, filed on Apr. 5, 2022.

(30) Foreign Application Priority Data

Apr. 30, 2021 (KR) .................. 10-2021-0056641

(51) Int. Cl.
*H04L 65/613* (2022.01)
*H04L 65/611* (2022.01)
(Continued)

(52) U.S. Cl.
CPC ........ *H04L 67/1095* (2013.01); *H04L 65/611* (2022.05); *H04L 65/613* (2022.05); *H04L 65/80* (2013.01)

(58) Field of Classification Search
CPC . H04L 67/1095; H04L 65/611; H04L 65/613; H04L 65/80; H04L 65/61; H04L 65/752
See application file for complete search history.

(56) References Cited

U.S. PATENT DOCUMENTS 10,375,499 B2 8/2019 Kitazawa
10,419,853 B2 9/2019 Hariharan et al.
(Continued)

FOREIGN PATENT DOCUMENTS

CN 110636487 12/2019
EP 3 228 096 10/2017
(Continued)

OTHER PUBLICATIONS

International Search Report dated Jul. 13, 2022 issued in counterpart application No. PCT/KR2022/004849, 9 pages.
(Continued)

*Primary Examiner* — Oanh Duong
(74) *Attorney, Agent, or Firm* — The Farrell Law Firm, P.C.

(57) ABSTRACT

An electronic device and a method are provided for recording audio data acquired from multiple devices. The electronic device includes a microphone, a communication module, a memory, and a processor configured to establish a first communication link with a first external electronic device through the communication module, establish a second communication link with a second external electronic device through the communication module, acquire a microphone input signal by operating the microphone based on receiving a recording request from the first external electronic device, monitor a transmission environment with the communication module or the second external electronic device, determine a bit rate of audio, based on the transmission environment, encode the audio, based on the deter-
(Continued)

mined bit rate, and transmit the encoded audio data to the first external electronic device.

13 Claims, 20 Drawing Sheets

(51) Int. Cl.
*H04L 65/80* (2022.01)
*H04L 67/1095* (2022.01)

(56) References Cited

U.S. PATENT DOCUMENTS

| | | | |
|---|---|---|---|
| 10,652,680 | B2 | 5/2020 | Shin et al. |
| 10,853,026 | B2 | 12/2020 | Park et al. |
| 10,966,047 | B1 | 3/2021 | Tong et al. |
| 11,240,586 | B1* | 2/2022 | Yan .................... H04W 4/80 |
| 2005/0256843 | A1 | 11/2005 | Hilpisch et al. |
| 2013/0223539 | A1 | 8/2013 | Lee et al. |
| 2019/0261089 | A1 | 8/2019 | Hariharan et al. |
| 2020/0004496 | A1 | 1/2020 | Park et al. |
| 2020/0059504 | A1* | 2/2020 | Ho ........................ H04L 65/80 |
| 2020/0075032 | A1* | 3/2020 | Joseph .................... G10L 19/24 |
| 2020/0267200 | A1* | 8/2020 | Baek ...................... H04L 65/70 |
| 2020/0286635 | A1* | 9/2020 | Lee ...................... A47L 15/0052 |
| 2022/0039179 | A1* | 2/2022 | Chen .................... H04R 1/1016 |

FOREIGN PATENT DOCUMENTS

| | | |
|---|---|---|
| KR | 1020160143148 | 12/2016 |
| KR | 1020180062230 | 6/2018 |
| KR | 10-1917174 | 11/2018 |
| KR | 20190143599 A * | 12/2019 |
| KR | 1020200100387 | 8/2020 |
| WO | WO 2016/050298 | 4/2016 |

OTHER PUBLICATIONS

European Search Report dated May 16, 2024 issued in counterpart application No. 22795989.7-1206, 13 pages.

* cited by examiner (450)

FIG. 6
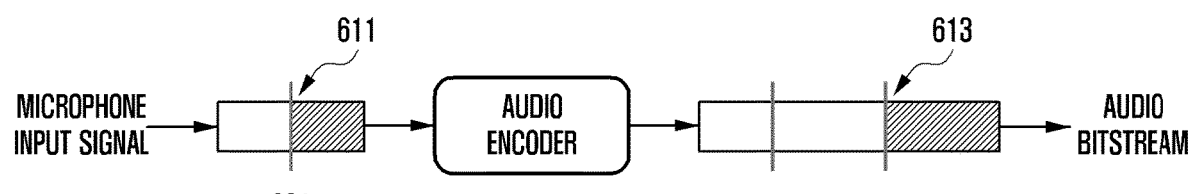
[610]
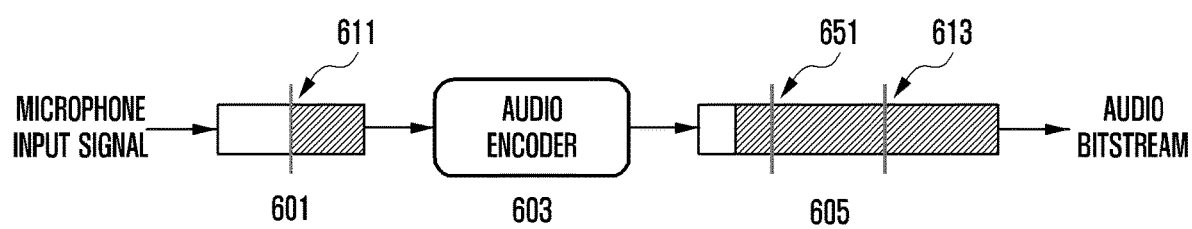
[650]

FIG. 12
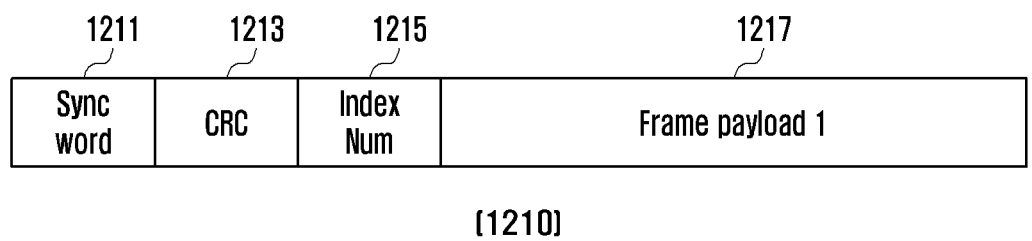
[1210]
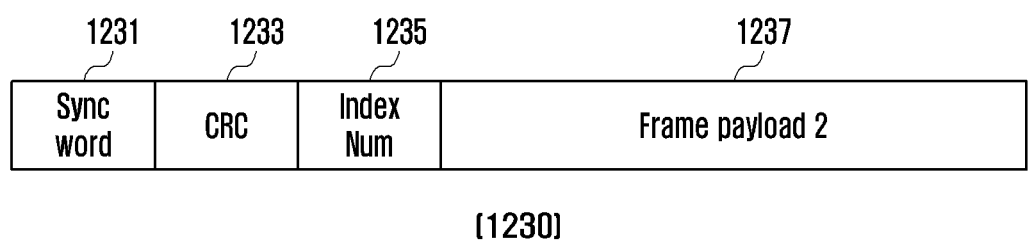
[1230]

ELECTRONIC DEVICE AND METHOD FOR RECORDING AUDIO DATA ACQUIRED FROM MULTIPLE DEVICES

CROSS-REFERENCE TO RELATED APPLICATION(S)

This application is a bypass continuation application of International Application No. PCT/KR2022/004849, which was filed on Apr. 5, 2022, and is based on and claims priority under 35 U.S.C. § 119 to Korean Patent Application No. 10-2021-0056641, which was filed in the Korean Intellectual Property Office on Apr. 30, 2021, the entire disclosure of each of which is incorporated herein by reference.

BACKGROUND

1. Field

The disclosure relates generally to an electronic device and a method for recording audio data acquired from multiple devices.

2. Description of Related Art

With development of digital technology, various types of electronic devices such as mobile communication terminals, personal digital assistants (PDAs), electronic notebooks, smartphones, tablet personal computers (PCs), and wearable devices are widely used. These electronic devices may be connected to and may exchange information with an external device such as a laptop computer, earphones, or headphones by using short-range wireless technology such as Bluetooth™. For example, an electronic device may be connected to earphones through Bluetooth™, and may output music or other sounds through the earphones.

Earphones in the form of true wireless stereo (TWS)-type wireless headsets (or wireless input/output devices) which can be inserted into each of a user's ears, respectively, have been launched. Such wireless headsets often have left and right devices in which microphones are included, respectively, and thus can perform binaural recording and record more authentic sounds.

However, due to the characteristics of a wireless input/output device, sound cutoff may occur in a weak electric field situation in which a wireless environment is not good, and a TWS-type wireless input/output device that is separated into left and right devices may experience a sound cutoff phenomenon according to a wireless environment more frequently. To address this issue, the size of audio data may be reduced, but the quality of a sound may be degraded when the size of the transmitted audio data is reduced. In addition, when sound cutoff occurs at different times in the left and right devices, it may be difficult for the TWS-type wireless input/output device to guarantee the synchronization between the left and right devices.

Further, when a codec is determined in an audio codec configuration stage, a normal Bluetooth™ headset using a Bluetooth™ advanced audio distribution profile (A2DP) may transmit an audio signal by using a determined bit rate and a packet type, and the bit rate and the packet type may not change. However, in a subway in which there is a large number wireless devices being used, or in a crowded environment in which there are many people, sound cutoff may occur, and when a transmission environment changes, it may be impossible to handle the case of the changed transmission environment.

SUMMARY

The disclosure addresses at least the problems and/or disadvantages described above and provides at least the advantages described below.

An aspect of the disclosure is to provide a method and a device for preventing sound cutoff and acquiring high-quality audio data by variably adjusting a bit rate of audio data acquired from each of a first device and a second device according to a transmission environment between an electronic device (e.g., a smartphone) and a wearable device (e.g., a wireless input/output device) including the first device and the second device.

In accordance with an aspect of the disclosure, an electronic device is provided, which includes a microphone, a communication module, a memory including a transmission buffer, and a processor configured to establish a first communication link with a first external electronic device through the communication module, establish a second communication link with a second external electronic device through the communication module, acquire a microphone input signal by operating the microphone based on receiving a recording request from the first external electronic device, monitor a transmission environment with the communication module or the second external electronic device, determine a bit rate of audio based on the transmission environment, encode the audio based on the determined bit rate, and transmit the encoded audio data to the first external electronic device.

In accordance with another aspect of the disclosure, an electronic device is provided, which includes a microphone, a communication module, a memory including a transmission buffer, and a processor configured to establish, through the communication module, a second communication link with a second external electronic device connected to a first external electronic device through a first communication link, receive a microphone open command from the second external electronic device, operate the microphone to acquire a microphone input signal, monitor a transmission environment with the communication module or the second external electronic device, determine a bit rate of audio, based on the transmission environment, encode the audio, based on the determined bit rate, and transmit the encoded audio data to the first external electronic device or the second external electronic device.

In accordance with another aspect of the disclosure, an electronic device is provided, which includes a communication module, a memory, and a processor configured to establish a first communication link with a first external electronic device through the communication module, transmit a recording indication to the first external electronic device in response to receiving a recording request from a user, receive first audio data acquired from the first external electronic device and second audio data acquired from a second external electronic device connected to the first external electronic device, and synchronize the first audio data with the second audio data.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a transmission buffer state of a wearable device according to an embodiment;

FIG. 12 illustrates audio data transmitted from a wearable device according to an embodiment;

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
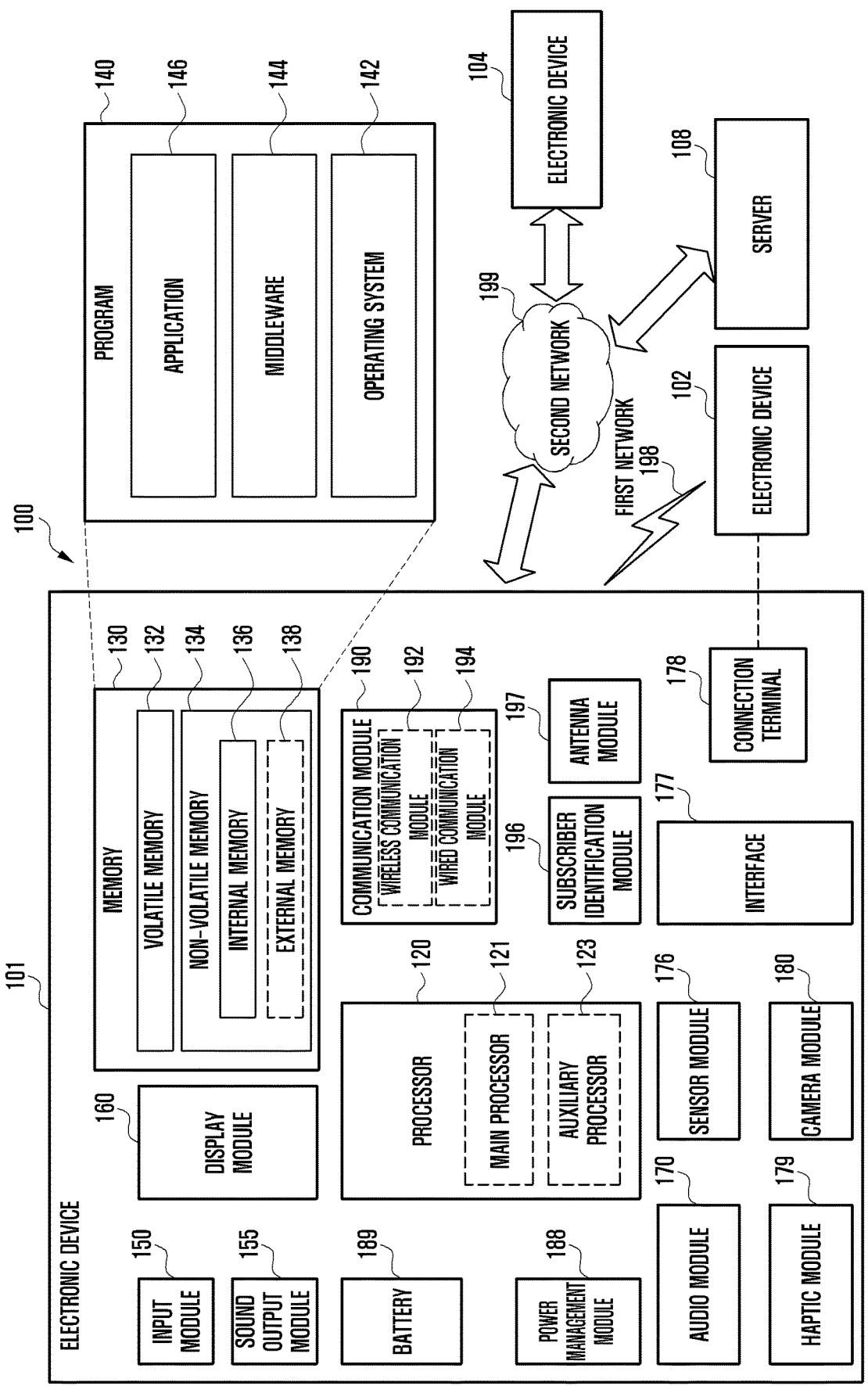
FIG. 1 illustrates an electronic device in a network environment according to an embodiment.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
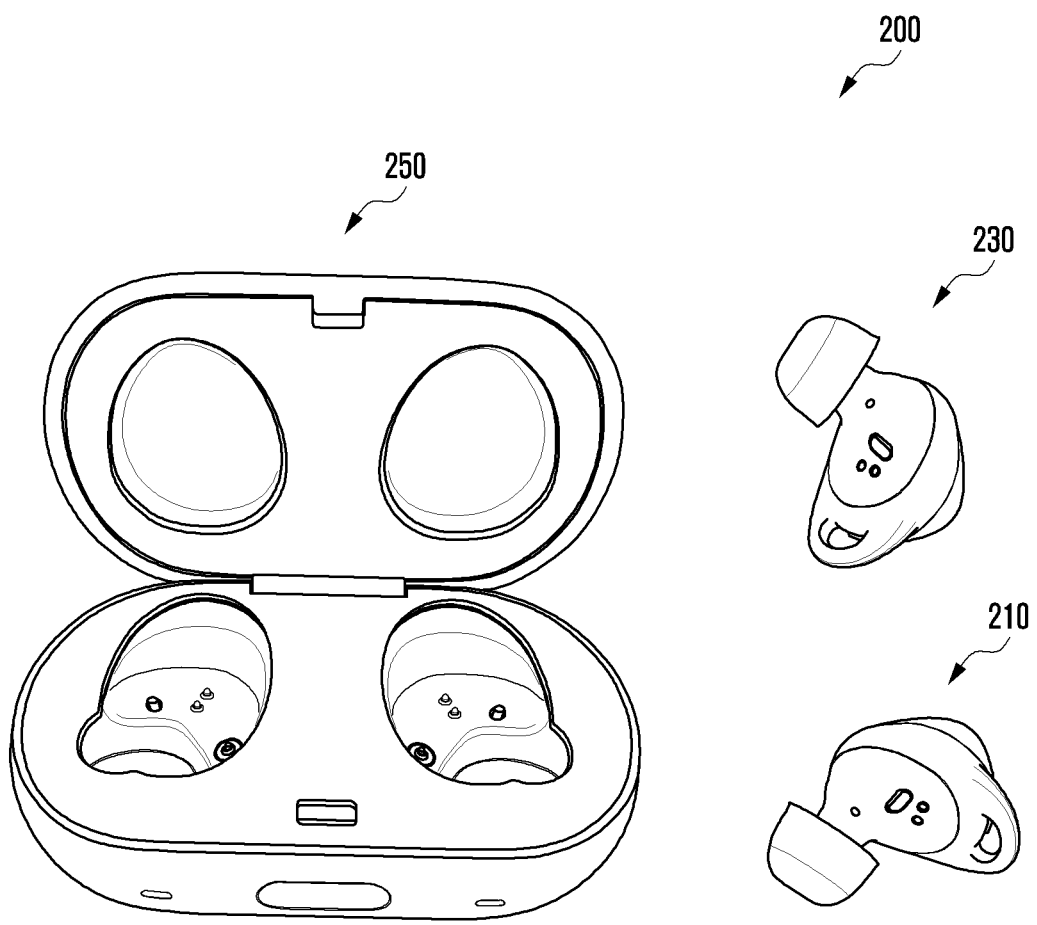
FIG. 2 illustrates a wearable device according to an embodiment.

FIG. 2 illustrates a wearable device according to an embodiment.

Referring to FIG. 2, a wearable device 200 (or a wireless communication device or a wireless input/output device) may wirelessly connect to an external electronic device (e.g., the electronic device 101 of FIG. 1) and transmit and/or receive information (or a signal) to and/or from the electronic device 101. Although the wearable device 200 is described herein as a type of wireless earphones in a TWS scheme, the wearable device 200 may also be an IoT device such as a Bluetooth™ speaker, a washing machine, a refrigerator, etc.

The wearable device 200 may receive an audio signal output from the electronic device 101 to output the same through a speaker, or transmit an audio signal input from the outside (e.g., a user) through a microphone to the electronic device 101. The wearable device 200 includes a first device 210, a second device 230, and a case 250. The wearable device according to various embodiments in the disclosure may correspond to various types of devices and may correspond to, for example, wireless earphones. Hereinafter, the wearable device 200 described in the disclosure may mean the first device 210 or the second device 230.

The first device 210 and the second device 230 may be received (or mounted) in the case 250, or may be removed (or dismounted) from the case 250. Each of the first device 210 and the second device 230 may be worn by a user (e.g., a user's left ear or a user's right ear). Each of the first device 210 and the second device 230 may include a speaker or a microphone. Each of the first device 210 and the second device 230 may output an audio signal through a speaker, or receive (or input) an audio signal from the outside through a microphone. When the first device 210 and the second device 230 are removed from the case 250, power the first device 210 and the second device 230 may be turned on. When the first device 210 and the second device 230 are mounted in the case 250, power of the first device 210 and the second device 230 may be turned off and the first device 210 and the second device 230 may be charged.

The first device 210 may take a master role, and the second device 230 may take a slave role. Conversely, the first device 210 may take a slave role, and the second device 230 may take a master role. The first device 210 and the second device 230 may transmit sensing information to the external electronic device periodically or in real time.

The case 250 includes a housing having a receiving part (or a space part) configured to receive (or store) the first device 210 and the second device 230, and a cover attached to the housing. The receiving part may be configured to magnetically drag the first device 210 or the second device 230 into the case 250 and keep the same therein. When the first device 210 and the second device 230 are mounted in the receiving part or the cover is closed, the case 250 may control the power of the first device 210 and the second device 230 to be turned off or the first device 210 and the second device 230 to be charged. When the first device 210 and the second device 230 are removed from the receiving part or the cover is opened, the case 250 may control the power of the first device 210 and the second device 230 to be turned on.

Figure 3:
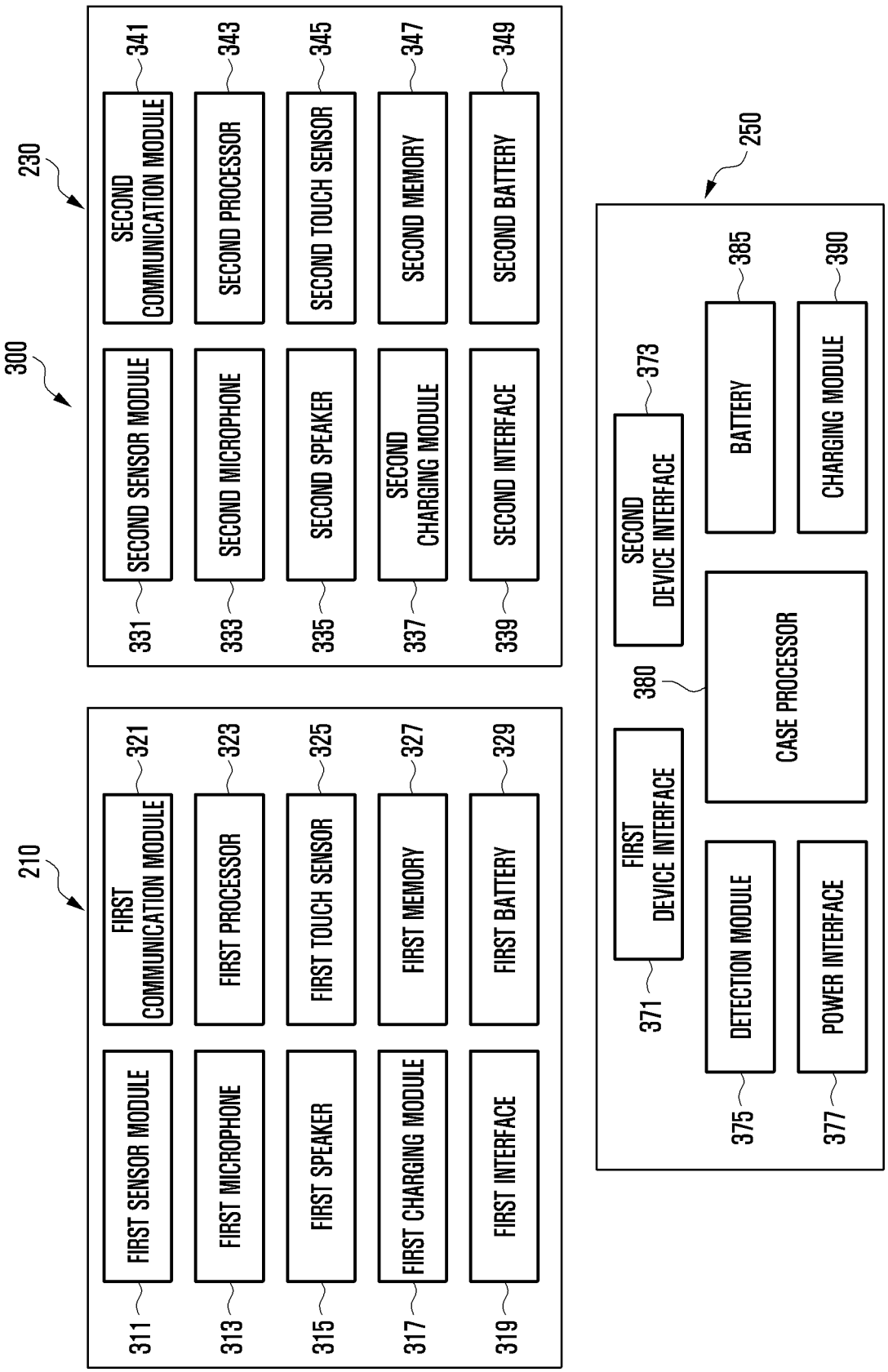
FIG. 3 illustrates a wearable device according to an embodiment.

FIG. 3 illustrates a wearable device according to an embodiment.

Referring to FIG. 3, a wearable device (e.g., the wearable device 200 of FIG. 2) according to various embodiments may include at least one of a first device (e.g., the first device 210 of FIG. 2), a second device (e.g., the second device 230 of FIG. 2), and a case (e.g., the case 250 of FIG. 2). Hereinafter, the wearable device 200 described in the disclosure may mean the first device 210 or the second device 230.

The first device 210 includes a first sensor module 311, a first microphone 313, a first speaker 315, a first charging module 317, a first interface 319, a first communication module 321, a first processor 323, a first touch sensor 325, a first memory 327, and a first battery 329. Alternatively, at least one of the elements may be omitted from the first device 210, and/or one or more other elements may be added to the first device 210. Additionally, some of the elements of the first device 210 may be integrated as a single element.

The first sensor module 311 is utilized to determine whether the first device 210 is worn, and may include at least one of a proximity sensor, a touch sensor, an acceleration sensor, or a gyro sensor. For example, the first sensor module 311 may be a proximity sensor or a touch sensor for detecting an object coming close to the first device 210. When the first sensor module 311 corresponds to a proximity sensor or a touch sensor, the first sensor module 311 may be disposed in an area inserted into a user's ear. Alternatively, the first sensor module 311 may include an acceleration sensor for measuring a dynamic force such as acceleration, vibration, and impact of an object, or may include a gyro sensor for measuring angular velocity of an object.

The first microphone 313 may acquire a sound (or audio) and convert the sound into an electric signal. The first microphone 313 may include an external microphone capable of picking up a sound from the outside, and an internal microphone capable of picking up a sound (e.g., an echo and a reverberation) reflected at a user's ear. The first speaker 315 may convert an electric signal into a sound and may output the sound to the outside of the first device 210.

The first speaker 315 may include a receiver. The first speaker 315 may be used for general purposes such as playing multimedia. The receiver may be used for receiving incoming calls. The receiver may be implemented as being separate from or as a part of the first speaker 315. The number of the first microphones 313 and the number of first speakers 315 may vary.

The first charging module 317 may manage power supplied to the first device 210. The first charging module 317 may charge the first battery 329 with power received through the first interface 319. The first charging module 317 may be implemented as at least a part of a PMIC. The first interface 319 may include a connector for physically connecting the first device 210 and the case 350 with each other.

The first communication module 321 may establish a wireless communication channel with an external electronic device (e.g., the electronic device 101 of FIG. 1 or the second device 230), and support performing communication through the established communication channel. The first communication module 321 may be connected to the external electronic device through Bluetooth™, Bluetooth™ lower energy (BLE), Wi-Fi, adaptive network topology (ANT+), long-term evolution (LTE), 5G mobile communication, and narrowband IoT (NB-IoT), or may be connected to an access point and a network. The first communication module 321 may receive a sound signal from the external electronic device, or may transmit sensing information (or a sensing signal) or a sound signal to the external electronic device.

The first processor 323 may execute software and control at least one another element (e.g., a hardware or software element) of the first device 210 connected to the first processor 323, and may perform various data processing or computation. As at least a part of the data processing or computation, the first processor 323 may store a command or data received from another element (e.g., the first sensor module 311 or the first communication module 321) in the first memory 327, process the command or data stored in the first memory 327, and store result data in the first memory 327.

The first processor 323 may include a main processor (e.g., a CPU or an AP) or an auxiliary processor (e.g., a sensor hub processor or a CP) that is operable independently from or in conjunction with the main processor. When the first device 210 includes the main processor and the auxiliary processor, the auxiliary processor may be configured to consume less power than the main processor, or to be specific to a specified function. The auxiliary processor may be implemented as separate from, or as part of the main processor.

The first processor 323 may establish a connection of a first communication link with the electronic device 101, and may establish a connection of a second communication link with the second device 230. The first communication link and the second communication link may correspond to different links (or channels) or different communication schemes. The first processor 323 may transmit information (e.g., a Bluetooth™ address, filesystem hierarchy system (FHS) packet information, and a link key) on the first communication link to the second device 230. When receiving a recording indication from the electronic device 101, the first processor 323 may indicate opening of a microphone open to the second device 230.

The first processor 323 may indicate opening of a microphone (or a microphone open command) to the second device 230, and open the first microphone 313 to receive (or acquire) audio when a predetermined time passes. The first processor 323 may exchange a transmission buffer state or exchange a signal strength with the second device 230 to monitor (or analyze) a transmission environment (or a wireless transmission environment). The transmission buffer state may include a current residual buffer space of a controller transmission buffer of the first device 210 or a current residual buffer space of a controller transmission buffer of the second device 230. The signal strength may include a signal strength (e.g., a receiver signal strength indicator (RSSI)) of the first device 210 or a signal strength of the second device 230.

The first processor 323 may determine a bit rate of audio, based on a transmission environment. For example, when the transmission buffer state has a value that that is less than or equal to a first threshold value or the signal strength exceeds a signal threshold value, the first processor 323 may determine that the transmission environment corresponds to a strong electric field (e.g., a state in which the transmission environment is good), and determine a first bit rate. Alternatively, when the transmission buffer state has a value exceeding the first threshold value or the signal strength is less than or equal to the signal threshold value, the first processor 323 may determine that the transmission environment corresponds to a weak electric field (e.g., a state in which the transmission environment is poor), and determine a second bit rate. The first bit rate may be greater than the second bit rate.

When the bit rate is determined, the first processor 323 may determine a packet type, based on the determined bit rate. The first processor 323 may encode and store audio, based on the determined bit rate. The first processor 323 may assign the same index number (or index value or index information) as that of the second device 230 to audio acquired at the same time point as a time point at which the second device 230 acquires the audio, so as to encode the audio. The first processor 323 may transmit stored first audio data (or audio packet) to the electronic device 101, or may transmit the stored first audio data together with second audio data acquired from the second device 230 to the electronic device 101.

The first touch sensor 325 may control the first device 210. When a touch is detected from the first touch sensor 325 while a sound is output from the first device 210, the first device 210 may stop playing. The first device 210 may start playing when a touch is detected from the first touch sensor 325 after the stop. The first touch sensor 325 may be disposed in an external area of the first device 210, which is not inserted into the user's ear, in order to receive a touch input while the user wears the first device 210. The touch input may include a single touch, multiple touches, a swipe, a flick, etc. Touch recognition through the first touch sensor 325 may be performed in various ways, e.g., using capacitive, resistive, IR, and/or ultrasonic schemes. The first device 210 may include a physical button and/or an optical key.

The first memory 327 (or a buffer) may store various data used by at least one element of the first device 210 (e.g., the first sensor module 311 or the first processor 323). The data may include software (e.g., a program) and input data or output data for a command related to the software.

The first battery 329 may supply power to at least one element of the first device 210. The first battery 329 may include a primary cell that is not rechargeable, a secondary cell that is rechargeable, and/or a fuel cell.

The second device 230 includes a second sensor module 331, a second microphone 333, a second speaker 335, a second charging module 337, a second interface 339, a second communication module 341, a second processor 343, a second touch sensor 345, a second memory 347, and a second battery 349. Alternatively, at least one of the elements may be omitted from the second device 230, and/or one or more other elements may be added to the second device 230. Some of the elements of the second device 230 may be integrated as a single element.

The elements included in the first device 210 and the elements included in the second device 230 are similar if not identical, and the terms "first" and "second" are utilized herein to distinguish between the elements.

The second sensor module 331 is utilized to determine whether the second device 230 is worn, and may include at least one of a proximity sensor, a touch sensor, an acceleration sensor, or a gyro sensor.

The second microphone 333 may convert a sound into an electric signal.

The second speaker 335 may convert an electric signal into a sound and may output the sound to the outside of the second device 230. The second speaker 335 may include a receiver. The second speaker 335 may be used may be used for general purposes such as playing multimedia. The receiver may be used for receiving incoming calls. The receiver may be implemented as being separate from, or as a part of the second speaker 335.

The second charging module 337 may manage power supplied to the second device 230 as at least a part of a PMIC. The second charging module 337 may charge the second battery 349 with power received through the second interface 339. The second interface 339 may include a connector capable of physically connecting the second device 230 and the case 350 with each other.

The second communication module 341 may establish a wireless communication channel with an external electronic device (e.g., the electronic device 101 of FIG. 1 or the first device 210), and support communication through the established communication channel. The second communication module 341 may receive a sound signal from the external electronic device, or may transmit sensing information (or a sensing signal) or a sound signal to the external electronic device.

The second processor 343 may execute software and control at least one another element (e.g., a hardware or software element) of the second device 230 connected to the second processor 343, and may perform various data processing or computation. The second processor 343 may establish a connection of a second communication link with the first device 210, or may establish a connection of a first communication link with the electronic device 101, based on the first communication link information received from the first device 210.

When receiving a microphone open indication (or a microphone open command) from the first device 210, the second processor 343 may open the second microphone 333 to receive (or acquire) audio when a predetermined time passes. The second processor 343 may exchange a transmission buffer state or exchange a signal strength with the first device 210 in order to monitor (or analyze) a transmission environment (or a wireless transmission environment). The transmission buffer state may include a current residual buffer space of a controller transmission buffer of the first device 210 or a current residual buffer space of a controller transmission buffer of the second device 230. The signal strength may include a signal strength (e.g., an RSSI) of the first device 210 or a signal strength of the second device 230.

The second processor 343 may determine a bit rate of audio, based on a transmission environment. For example, when the transmission buffer state has a value that is less than or equal to a first threshold value or the signal strength exceeds a signal threshold value, the second processor 343 may determine that the transmission environment corresponds to a strong electric field (e.g., a state in which the transmission environment is good), and determine a first bit rate. Alternatively, when the transmission buffer state has a value exceeding the first threshold value or the signal strength is less than or equal to the signal threshold value, the second processor 343 may determine that the transmission environment corresponds to a weak electric field (e.g., a state in which the transmission environment is poor), and determine a second bit rate. The first bit rate may be greater than the second bit rate.

When the bit rate is determined, the second processor 343 may determine a packet type, based on the determined bit rate. The second processor 343 may encode and store audio, based on the determined bit rate. The second processor 343 may assign the same index number (or index value or index information) as that of the first device 210 to audio acquired at the same time point at which the first device 210 acquires the audio, so as to encode the audio. The second processor 343 may transmit stored second audio data (or audio packet) to the first device 210 or the electronic device 101.

The second touch sensor 345 may correspond to a sensor for controlling the second device 230. When a touch is detected from the second touch sensor 345 while a sound is output from the second device 230, the second device 230 may stop playing. The second device 230 may start playing again when a touch is detected from the second touch sensor 345 after the stop. The second memory 347 (or a buffer) may store various data used by at least one element of the second device 230 (e.g., the second sensor module 331 or the second processor 343). The data may include software (e.g., a program), and input data or output data for a command related the software.

The second battery 349 may supply power to at least one element of the second device 230.

The case 250 includes a first device interface 371, a second device interface 373, a detection module 375, a power interface 377, a case processor 380, a battery 385, and a charging module 390. The first device interface 371 and the second device interface 373 may be physically connected to the first device 210 and the second device 230. For example, the first device interface 371 may be connected to the first interface 319 of the first device 210, and the second device interface 373 may be connected to the second interface 339 of the second device 230.

The case processor 380 may control an operation of the case 250. The case processor 380 may control other elements included in the case 250 (e.g., the charging module 390 and the detection module 375), and perform various data processing or computation. The case processor 380 may control the first device 210 to be charged when the first device 210 is connected, and may control the second device 230 to be charged when the second device 230 is connected.

The charging module 390 may manage power supplied to the first device 210, the second device 230, or the case 250. The charging module 390 may supply power to the first device 210 through the first device interface 371, and supply power to the second device 230 through the second device interface 373. The charging module 390 may charge the battery 385 with the power received through the power interface 377.

The detection module 375 may detect whether the first device 210 or the second device 230 is mounted (or received) in the case 250. When the first device 210 or the second device 230 is mounted in the receiving part of the case 250, the detection module 375 may transfer an indication to the case processor 380. The detection module 375 may include at least one sensor for detecting whether at least one of the first device 210 or the second device 230 is positioned in the case 250. The detection module 375 may correspond to a circuit for periodically ping contacting parts (e.g., the first device interface 371 or the second device interface 373) which are in contact with (or connected with) the first device 210 or the second device 230. The detection module 375 may include a magnetic sensor, an optical sensor, a switch, a Hall effect sensor, a magnetic flux sensor, a capacitive sensor, a photodetector, a proximity detector, a momentary switch, a mechanical sensor, and/or an electric sensor.

The battery 385 may supply power to at least one element of the case 350. The power interface 377 may be physically connected to an external power source unit.

FIGS. 4A to 4D illustrate a network environment between an electronic device and a wearable device according to an embodiment.

Figure 4A:
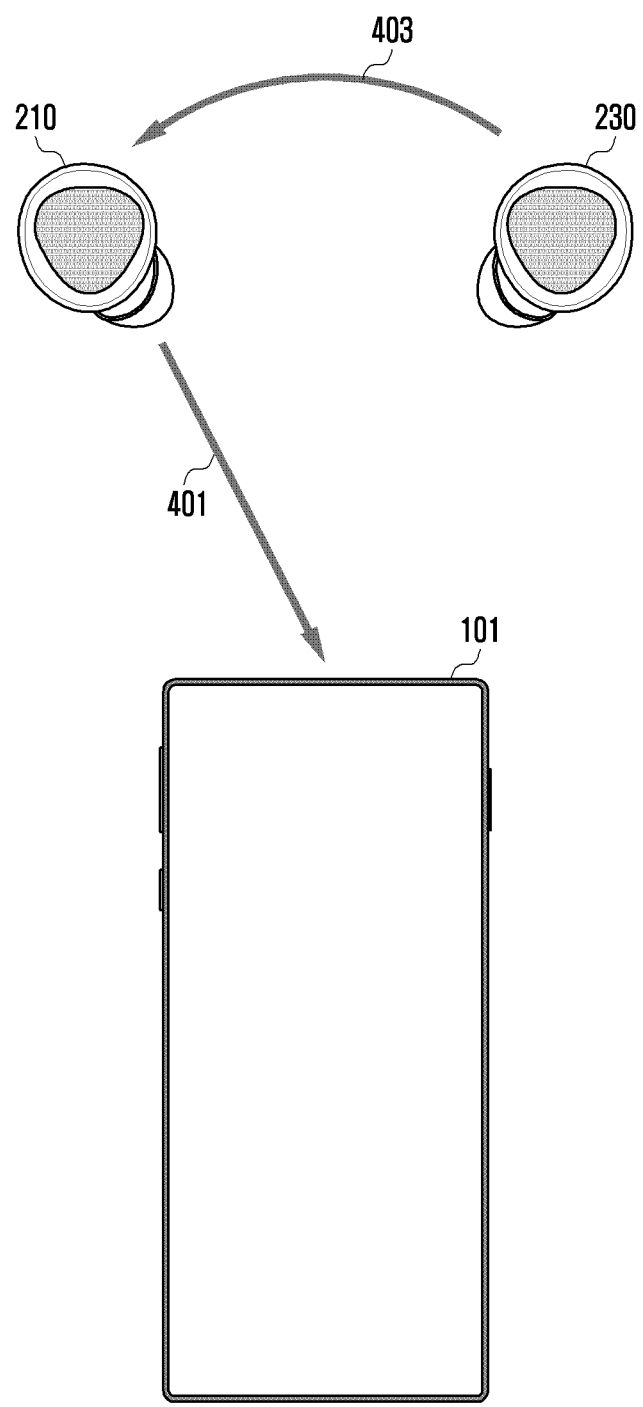
FIGS. 4A to 4D illustrate a network environment between an electronic device and a wearable device according to an embodiment.

More specifically, FIG. 4A illustrates an electronic device and a wearable device connected via a network.

Referring to FIG. 4A, an electronic device (e.g., the electronic device 101 of FIG. 1) may be connected to a wearable device (e.g., the wearable device 200 of FIG. 2) in a first scheme 410. The wearable device 200 may include a first device (e.g., the first device 210 of FIG. 2) and a second device (e.g., the second device 230 of FIG. 2) separated into left and right parts, respectively, in a TWS scheme. The first device 210 may be referred to as a primary equipment (PE) capable of performing direct connection to the electronic device 101, and the second device 230 may be referred to as a secondary equipment (SE) that is not directly connected to the electronic device 101.

The first scheme 410 corresponds to a relay scheme, wherein the first device 210 forms a first communication link 401 with the electronic device 101, and may form (or establish a connection of) a second communication link 403 with the second device 230. The first communication link 401 and the second communication link 403 may correspond to different links (or channels) or different schemes. For example, the first communication link 401 may be connected in a Bluetooth™ scheme, and the second communication link 403 may be connected in a BLE scheme.

The second device 230 may transmit second audio data (e.g., audio packet 2) acquired by the second device 230 itself to the first device 210 through the second communication link 403. The first device 210 may synchronize first audio device (e.g., audio packet 1) acquired by the first device 210 with the second audio data acquired from the second device 230 (e.g., audio packet 1+audio packet 2) and transmit the same to the electronic device 101 through the first communication link 401. The electronic device 101 may store the received first audio data and second audio data in a memory (e.g., the memory 130 of FIG. 1). Alternatively, the electronic device 101 may also synchronize the first audio data with the second audio data and store the same, based on an index number included in each audio data. The electronic device 101 may output the first audio data and the second audio data through a speaker (e.g., the sound output module 155 of FIG. 1).

Figure 4B:
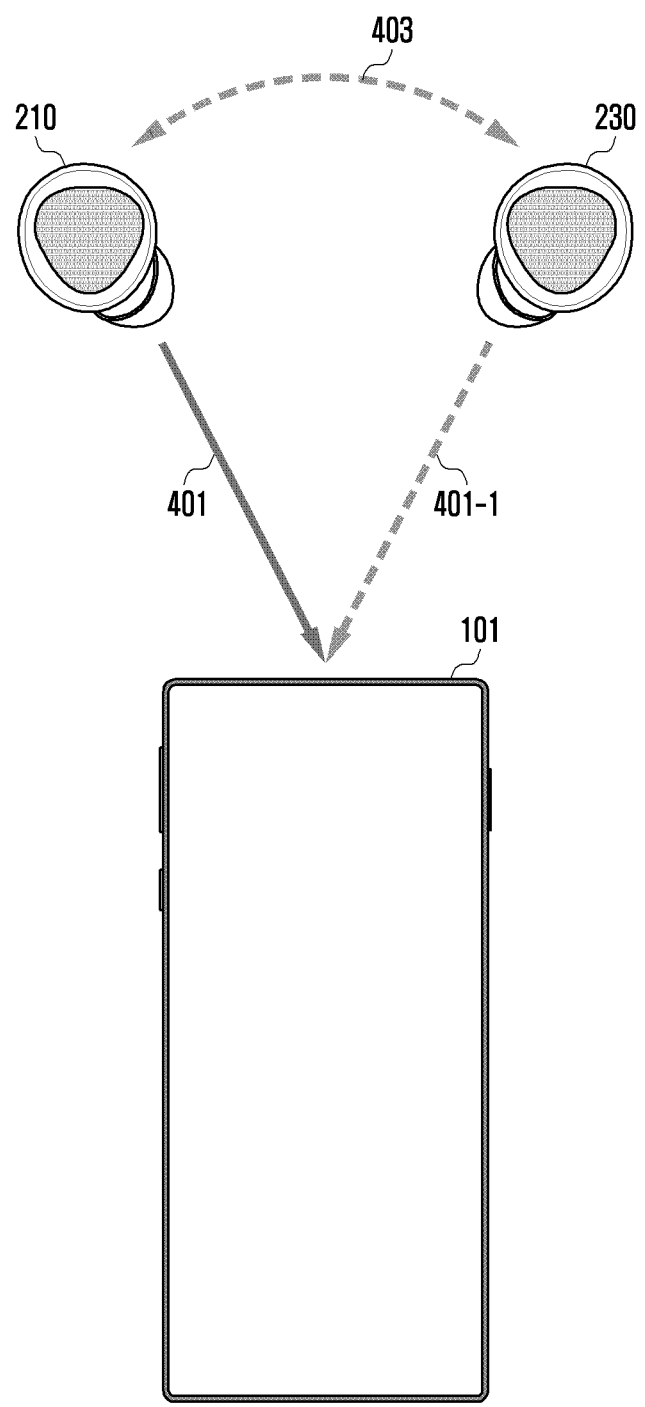

FIG. 4B illustrates an electronic device and a wearable device connected via a network.

Referring to FIG. 4B, the electronic device 101 may be connected to the wearable device 200 in a second scheme 430. The second scheme 430 corresponds to a sniffing scheme, wherein the first device 210 forms a first communication link 401 with the electronic device 101, forms (or establishes a connection of) a second communication link 403 with the second device 230, and transmits information (e.g., first communication link information) on the first communication link 401 to the second device 230. The second device 230 forms (or establishes a connection of) a $(1\text{-}1)^{th}$ communication link 401-1 with the electronic device 101, based on the first communication link information. The first communication link information may include information for connection to the first communication link 401, such as a Bluetooth™ address, FHS packet information, and a link key.

The first communication link 401 and the $(1\text{-}1)^{th}$ communication link 401-1 may correspond to the same channel or the same communication scheme. The second device 230 may receive (e.g., perform sniffing) information (or a packet) for transmitted or received between the first device 210 and the electronic device 101 through the $(1\text{-}1)^{th}$ communication link 401-1. The electronic device 101 may recognize that the first device 210 connected via the first communication link 401 is identical to the second device 230 connected via the $(1\text{-}1)^{th}$ communication link 401-1.

In the second scheme 430, the second communication link 403, unlike in FIG. 4A, may be used to transmit or receive a control signal or information between the first device 210 and the second device 230, and may not be used for the use of transferring a data packet. The first device 210 may transmit first audio data (e.g., audio packet 1) acquired by the first device 210 to the electronic device 101 through the first communication link 401, and the second device 230 may directly transmit second audio data acquired by the second device 230 to the electronic device 101 through the $(1\text{-}1)^{th}$ communication link 401-1. That is, the first device 210 and the second device 230 may transmit audio data acquired to the electronic device 101 through the first communication link 401 or the $(1\text{-}1)^{th}$ communication link 401-1, respectively. The electronic device 101 may synchronize the first audio data with the second audio data, based on an index number included in each of the first audio data and the second audio data, and store the same in the memory

130. The electronic device 101 may output the first audio data and the second audio data through a sound output module.

Figure 4C:
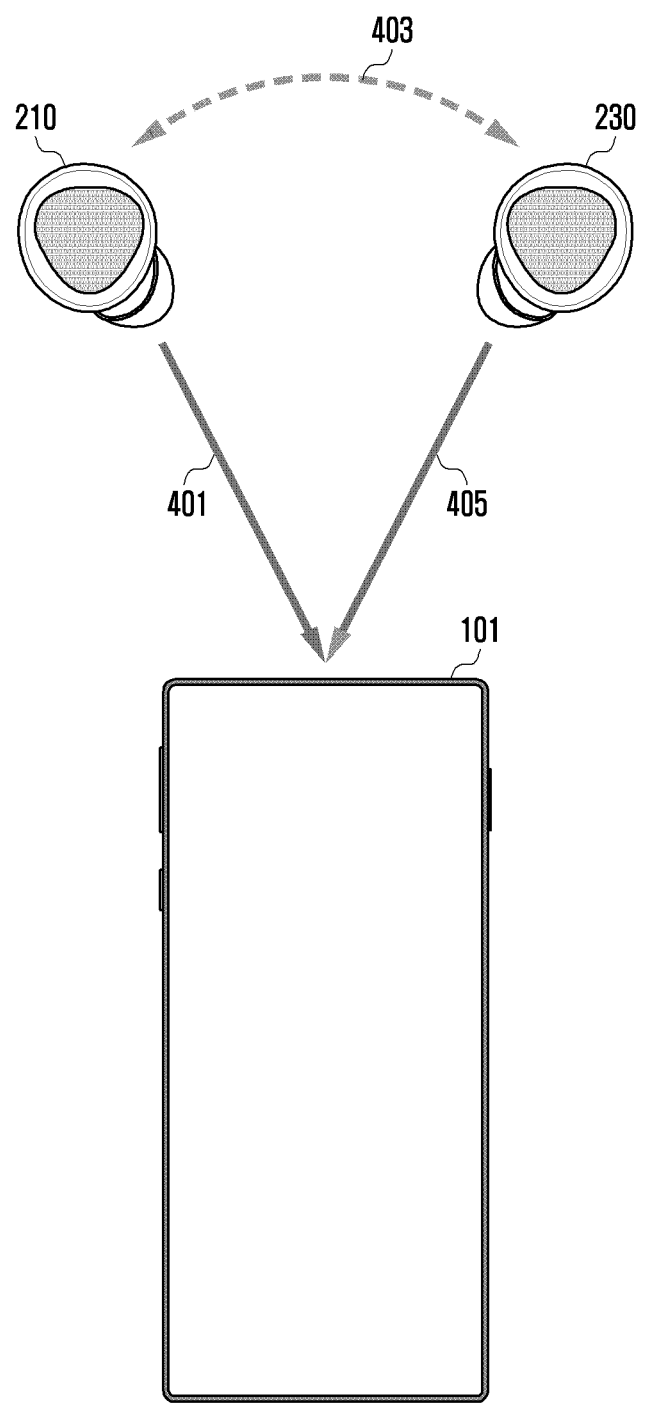

FIG. 4C illustrates an electronic device and a wearable device connected via a network.

Referring to FIG. 4C, the electronic device 101 may be connected to the wearable device 200 in a third scheme 450. The third scheme 450 corresponds to an independent link scheme, wherein the first device 210 may form a first communication link 401 with the electronic device 101, and the second device 230 may form a third communication link 405 with the electronic device 101, and form (or establish a connection of) a second communication link 403 between the first device 210 and the second device 230. The first communication link 401 and the third communication link 405 may have the same or similar communication scheme.

In the third scheme 450, the second communication link 403, unlike the first scheme 410, may be used to transmit or receive a control signal and information between the first device 210 and the second device 230, but may not be used for the use of transferring a data packet. The first device 210 may transmit first audio data (e.g., audio packet 1) acquired by the first device 210 to the electronic device 101 through the first communication link 401, and the second device 230 may directly transmit second audio data (e.g., audio packet 2) acquired by the second device to the electronic device 101 through the third communication link 405. The electronic device 101 may synchronize the first audio data with the second audio data, based on an index number included in each of the first audio data and the second audio data, and store the same in the memory 130. The electronic device 101 may output the first audio data and the second audio data through the sound output module 155.

Figure 4D:
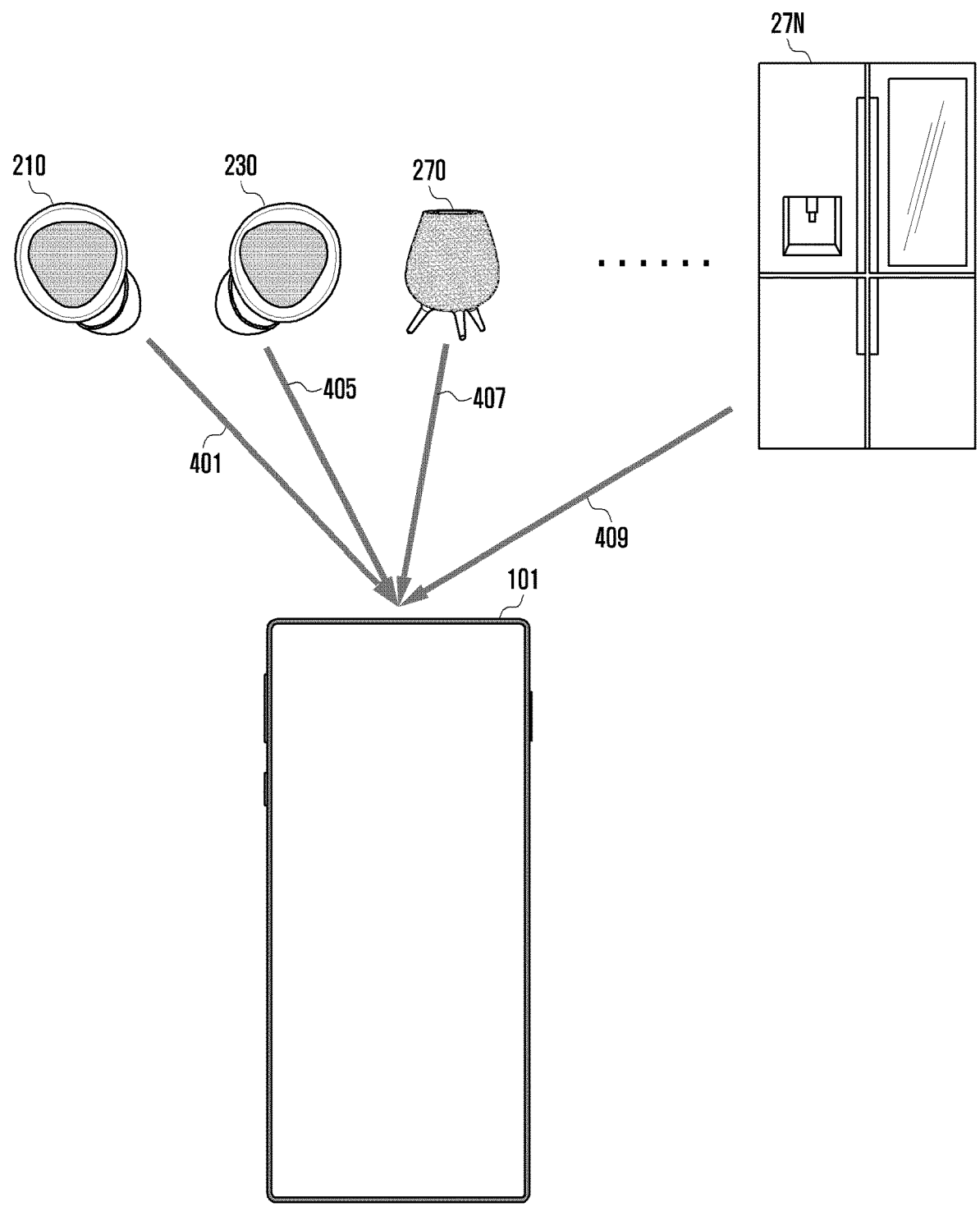

FIG. 4D illustrates an electronic device and multiple wearable devices connected via a network.

Referring to FIG. 4D, the electronic device 101 may be connected to multiple wireless input/output devices in a fourth scheme 470. The fourth scheme 470 corresponds to an independent link scheme, wherein the first device 210 may form a first communication link 401 with the electronic device 101, the second device 230 may form a third communication link 405 with the electronic device 101, the third device 270 may form a fourth communication link 407 with the electronic device 101, and an $n^{th}$ device 27N may form a fifth communication link 409 with the electronic device 101. The first communication link 401, the third communication link 405, the fourth communication link 407, and the fifth communication link 409 may have the same or similar communication scheme.

The third device 270 may include a Bluetooth™ speaker, and the $n^{th}$ device 27N may be a home appliance (e.g., a refrigerator), but these devices are not limited to these specific examples.

In the fourth scheme 470, the first device 210 may transmit first audio data (e.g., audio packet 1) acquired by the first device 210 to the electronic device 101 through the first communication link 401, the second device 230 may transmit second audio data (e.g., audio packet 2) acquired by the second device 230 to the electronic device 101 through the third communication link 405, the third device 270 may transmit third audio data (e.g., audio packet 3) acquired by the third device 270 to the electronic device 101 through the fourth communication link 407, and the $n^{th}$ device 27N may transmit $n^{th}$ audio data (e.g., audio packet n) acquired by the $n^{th}$ device 27N to the electronic device 101 through the fifth communication link 409. The electronic device 101 may synchronize the first audio data to the $n^{th}$ audio data, based on an index number included in each of the first audio data to the $n^h$ audio data, and store the same in the memory 130. The electronic device 101 may output the first audio data to the $n^{th}$ audio data through the sound output module 155.

According to an embodiment, an electronic device (e.g., the first device 210 of FIG. 2) according to various embodiments may include a microphone (e.g., the first microphone 313 of FIG. 3), a communication module (e.g., the first communication module 321 of FIG. 3), a memory (e.g., the first memory 327 of FIG. 3) including a transmission buffer, and a processor (e.g., the first processor 323 of FIG. 3) operatively connected to the microphone, the communication module, or the memory, wherein the processor is configured to establish a connection of a first communication link with a first external electronic device (e.g., the electronic device 101 of FIG. 1) through the communication module, establish a connection of a second communication link with a second external electronic device (e.g., the second device 230 of FIG. 2) through the communication module, acquire a microphone input signal by operating the microphone upon reception of a recording request from the first external electronic device, monitor a transmission environment with the communication module or the second external electronic device, determine a bit rate of audio, based on the transmission environment, encode the audio, based on the determined bit rate, and transmit the encoded audio data to the first external electronic device.

The processor may be configured to exchange a signal strength or a transmission buffer state with the second external electronic device, and monitor the transmission environment, based on the transmission buffer state or the signal strength.

The processor may be configured to determine a first bit rate when the transmission buffer state has a value equal to or smaller than a first threshold value or the signal strength exceeds a signal threshold value, and determine a second bit rate that is lower than the first bit rate when the transmission buffer state has a value exceeding the first threshold value or the signal strength is equal to or lower than the signal threshold value.

The processor may be configured to assign the same index number as that of the second external electronic device to audio acquired at the same time point as a time point at which the second external electronic device acquires the audio.

The processor may be configured to encode the audio to acquire first audio data, receive second audio data from the second external electronic device through the second communication link, and synchronize the first audio data with the second audio data to transmit the synchronized audio data to the first external electronic device through the first communication link.

The processor may be configured to synchronize the first audio data with the second audio data, based on an index number included in each of the first audio data and the second audio data.

The processor may be configured to transmit information on the first communication link to the second external electronic device.

According to an embodiment, an electronic device (e.g., the second device 230 of FIG. 2) may include a microphone (e.g., the second microphone 333 of FIG. 3), a communication module (e.g., the second communication module 341 of FIG. 3), a memory (e.g., the second memory 347 of FIG. 3) including a transmission buffer, and a processor (e.g., the second processor 343 of FIG. 3) operatively connected to the microphone, the communication module, or the memory, wherein the processor is configured to establish a connection of a second communication link with a second external electronic device (e.g., the first device 210 of FIG. 2) connected to a first external electronic device (e.g., the electronic device 101 of FIG. 1) through a first communication link, through the communication module, receive a microphone open command from the second external electronic device, operate the microphone to acquire a microphone input signal, monitor a transmission environment with the communication module or the second external electronic device, determine a bit rate of audio, based on the transmission environment, encode the audio, based on the determined bit rate, and transmit the encoded audio data to the first external electronic device or the second external electronic device.

The processor may be configured to exchange a transmission buffer state or a signal strength with the second external electronic device, and monitor a transmission environment, based on the transmission buffer state or the signal strength.

The processor may be configured to determine a first bit rate when the transmission buffer state has a value equal to or smaller than a first threshold value or the signal strength exceeds a signal threshold value, and determine a second bit rate that is lower than the first bit rate when the transmission buffer state has a value exceeding the first threshold value or the signal strength is equal to or lower than the signal threshold value.

The processor may be configured to assign the same index number as that of the second external electronic device to audio acquired at the same time point as a time point at which the second external electronic device acquires the audio.

The processor may be configured to transmit the encoded audio data to the second external electronic device through the second communication link.

The processor may be configured to receive information on the first communication link from the second external electronic device through the second communication link, and establish a connection of the first communication link with the first external electronic device, based on the information on the first communication link.

The processor may be configured to transmit the encoded audio data to the first external electronic device through the first communication link.

According to an embodiment, an electronic device (e.g., the electronic device 101 of FIG. 1) may include a communication module (e.g., the communication module 190 of FIG. 1), a memory (e.g., the memory 130 of FIG. 1), and a processor (e.g., the processor 120 of FIG. 1) operatively connected to the communication module or the memory, wherein the processor may be configured establish a first communication link with a first external electronic device (e.g., the first device 210 of FIG. 2) through the communication module, transmit a recording indication to the first external electronic device upon reception of a recording request from a user, receive first audio data acquired from the first external electronic device or second audio data acquired from a second external electronic device (e.g., the second device 230 of FIG. 2) connected to the first external electronic device, and synchronize the first audio data with the second audio data.

The processor may be configured to receive the second audio data from the second external electronic device which performs sniffing of the first communication link.

The processor may be configured to synchronize the first audio data with the second audio data, based on an index number included in each audio data.

The processor may be configured to establish a second communication link with the second external electronic device through the communication module, and establish a third communication link with a third external electronic device through the communication module.

The processor may be configured to receive the second audio data from the second external electronic device through the second communication link, and receive the third audio data from the third external electronic device through the third communication link.

The processor may be configured to synchronize the first audio data to the third audio data.

Figure 5:
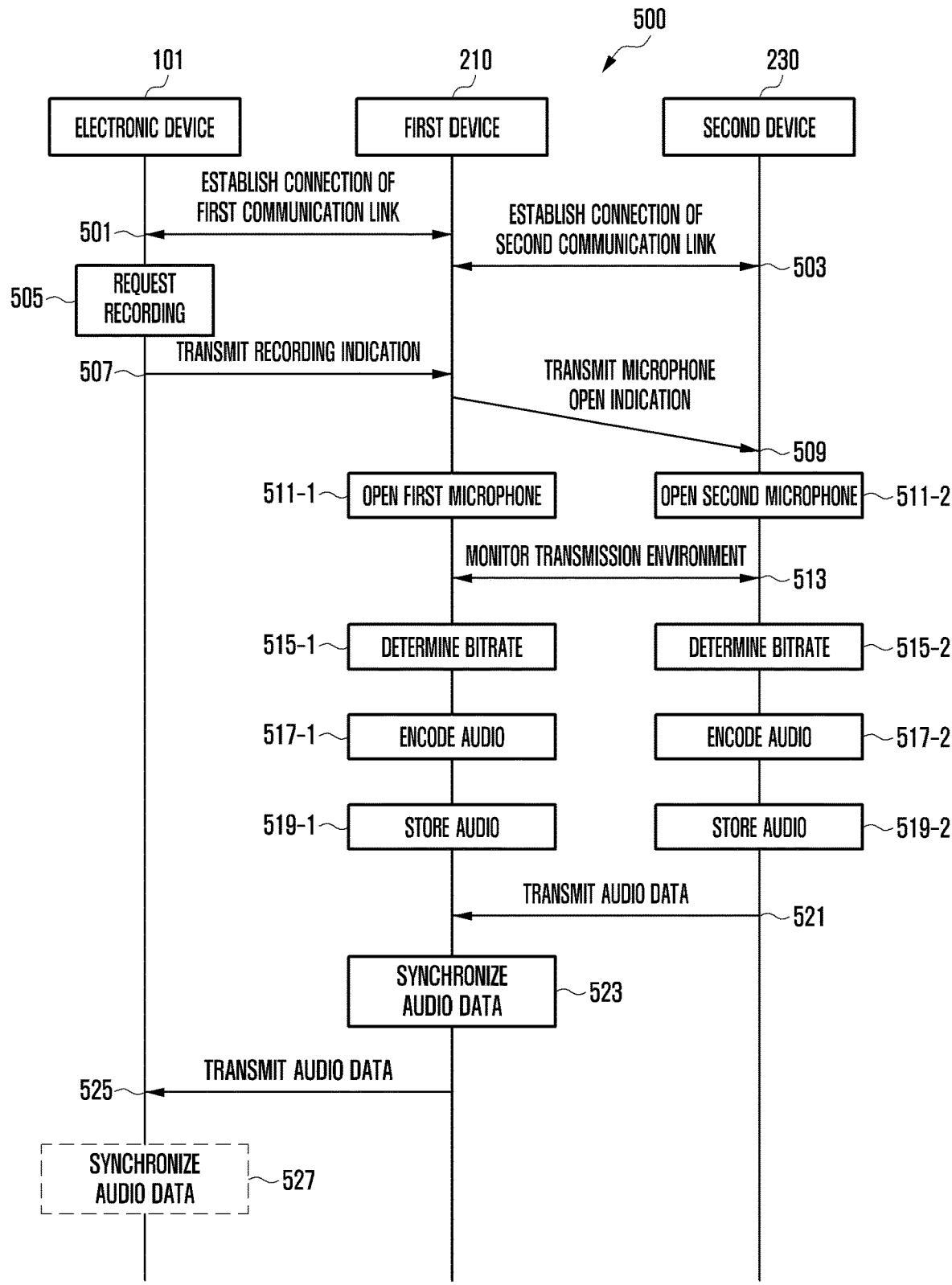
FIG. 5 is a signal flow diagram illustrating operations between an electronic device and a wearable device according to an embodiment.

FIG. 5 is a signal flow diagram illustrating operations between an electronic device and a wearable device according to an embodiment.

Referring to FIG. 5, in step 501, an electronic device (e.g., the electronic device 101 of FIG. 1) establishes (or forms) a first communication link (e.g., the first communication link 401 of FIGS. 4A to 4D) with a first device (e.g., the first device 210 of FIG. 2) of a wearable device (e.g., the wearable device 200 of FIG. 2). The first device 210 may form the first communication link 401 with the electronic device 101 through a communication module (e.g., the first communication module 321 of FIG. 3). The first communication link 401 may be short-distance wireless communication such as Bluetooth™ or BLE.

In step 503, the first device 210 establishes (or forms) a second communication link (e.g., the second communication link 403 of FIGS. 4A to 4C) with a second device (e.g., the second device 230 of FIG. 2) of the wearable device. The second communication link 403 may be different from the first communication link 401, or may utilize a different communication scheme than the first communication link 401.

In step 505, the electronic device 101 receives a recording request from a user. For example, when a user input for executing an application for recording and selecting (or pressing) a recording button is received, the electronic device 101 may determine that the recording request has been received.

In step 507, the electronic device 101 transmits a recording indication to the first device 210 based on the recording request. Because the electronic device 101 is only connected to the first device 210 through the first communication link 401, it may only transmit the recording indication to the first device 210.

In step 509, the first device 210 transmits a microphone open indication to the second device 230 based on the recording indication. The microphone open indication may include a command to acquire audio by operating (or opening) a microphone. The microphone open indication may include an indication (or guidance) of a time (or a time point) to operate the microphone, based on clock information synchronized between the first device 210 and the second device 230. For example, the microphone open indication may cause the microphone to operate after a predetermined time has elapsed since the microphone open indication was received.

In step 511-1, the first device 210 opens (or operates) a first microphone (e.g., the first microphone 313 of FIG. 3). The first device 210 may transmit the microphone open indication, and operate the first microphone 313 after a predetermined time to acquire audio at the same time point as the second device 230 acquires the audio. The first device 210 may acquire (or receive) the audio through the first microphone 313.

In step 511-2, the second device 230 opens (or operates) a second microphone (e.g., the second microphone 333 of FIG. 3). The second device 230 may receive the microphone open indication, and operate the second microphone 333 after a predetermined time to acquire audio at the same time point as the first device 210 acquires the audio. The second device 230 may acquire (or receive) the audio through the second microphone 333.

Steps 511-1 and 511-2 may be performed simultaneously.

In step 513, the first device 210 and the second device 230 monitor (or analyze) a transmission environment. In order to monitor the transmission environment, the first device 210 and the second device 230 may exchange transmission buffer states or signal strengths with each other. For example, the transmission buffer state may include a current residual buffer space of a controller transmission buffer of a transmission device (e.g., the first device 210 and the second device 230). The first device 210 may identify a packet transmission situation between the first device 210 and the second device 230, based on a residual buffer space of the first device 210 and a residual buffer space of the second device 230. The controller transmission buffer may correspond to an output buffer for storing an audio signal (or audio data) encoded by an audio encoder or a microphone input buffer of a transmission device.

The signal strength may include a signal strength (e.g., an RSSI) measured by the first device 210 or a signal strength measured by the second device 230. When the first device 210 and the second device 230 or the first device 210 and the electronic device 101 are close to each other, the signal strength may exceed a signal threshold value (e.g., a transmission state is good). However, when the first device 210 and the second device 230 or the first device 210 and the electronic device 101 are far from each other, the signal strength may be less than or equal to the signal threshold value (e.g., a transmission state is poor). The first device 210 and the second device 230 may share transmission environments with each other.

In step 515-1, the first device 210 determines a bit rate, based on the monitored transmission environment. When the transmission buffer state has a value that is less than or equal to a first threshold value or the signal strength exceeds a signal threshold value, the first device 210 may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the first device 210 may determine that the transmission environment corresponds to a weak electric field (e.g., a state in which the transmission environment is poor), and determine a second bit rate. The first bit rate may be greater than the second bit rate. When the bit rate is determined, the first device 210 may determine a packet type, based on the determined bit rate.

Similarly, in step 515-2, the second device 230 determines a bit rate, based on the monitored transmission environment. When the transmission buffer state has a value that is less than or equal to the first threshold value or the signal strength exceeds the signal threshold value, the second device 230 may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the second device 230 may determine that the transmission environment corresponds to a weak electric field (e.g., a state in which the transmission environment is poor), and determine a second bit rate. The first bit rate may be greater than the second bit rate. When the bit rate is determined, the second device 230 may determine a packet type, based on the determined bit rate.

As FIG. 5 illustrates the relay scheme in FIG. 4A, wherein the first device 210 may communicate with the electronic device 101 or the second device 230, and the second device 230 may communicate with the first device 210. The first device 210 and the second device 230 may have different transmission environments from each other. When a transmission environment of the first device 210 is different from a transmission environment of the second device 230, a bit rate may be determined based on a device having a poor transmission environment. For example, for the TWS-type wearable device 200 separated into left and right parts, when the first device 210 and the second device 230 perform encoding at different bit rates, a user may experience inconvenience in matching between the first device 210 and the second device 230. Accordingly, when the transmission environment of the first device 210 or the second device 230 exceeds a second threshold value, both the first device 210 and the second device 230 may lower the bit rates.

There may be one or more threshold values related to the transmission buffer state, and different bit rates may be determined based on the respective threshold values. There may be one or more signal threshold values related to the signal strength, and different bit rates may be determined based on the respective signal threshold values. When the transmission environment based on the transmission buffer state is different from the transmission environment based on the signal strength, a bit rate may be determined by prioritizing the transmission environment based on the transmission buffer state. Alternatively, the bit rate may be determined based on a corresponding threshold value among one or more threshold values according to the transmission buffer state and a corresponding threshold value among one or more threshold values according to the signal strength.

Steps 515-1 and 515-2 may be performed simultaneously, or at similar time points.

In step 517-1, the first device 210 encodes the audio (e.g., a microphone input signal) acquired through a first microphone 313. The first device 210 may encode the microphone input signal at the determined bit rate. The first device 210 may synchronize a microphone input with that of the second device 230 through the second communication link 403. The synchronized microphone input signal may be encoded through an audio encoder of the first device 210, and for audio data encoded at the same time point, the first device 210 may assign the same index number (or index value) as that of the second device 230. The index number may be positioned within the encoded audio data (or bitstream), or may be included in a header of the transmitted audio packet.

Similarly, in step 517-2, the second device 230 encodes the audio acquired through a second microphone 333. The second device 230 may encode the microphone input signal at the determined bit rate. The second device 230 may synchronize a microphone input with that of the first device 210 through the second communication link 403. The synchronized microphone input signal may be encoded through an audio encoder of the second device 230, and for audio data encoded at the same time point, the second device 230 may assign the same index number (or index value) as that of the first device 210. The index number may be positioned within the encoded audio data (or bitstream), or may be included in a header of the transmitted audio packet.

Steps 517-1 and 517-2 may be performed simultaneously, or at similar time points.

In step 519-1, the first device 210 stores the encoded audio data in a first memory (e.g., the first memory 327 of FIG. 3). The storing of the audio data in the first memory 327 may include temporary storage in an output buffer before transmitting the same to the electronic device 101. The audio data output from the output buffer of the first device 210 may be referred to as "first audio data", a "first audio bitstream", or a "first audio packet".

In step 519-2, the second device 230 stores the encoded audio data in a second memory (e.g., the second memory 347 of FIG. 3). The storing of the audio data in the second memory 347 may include temporary storage in an output buffer before transmitting the same to the first device 210. The audio data output from the output buffer of the second device 230 may be referred to as "second audio data", a "second audio bitstream", or a "second audio packet".

In order to distinguish the audio data acquired and encoded by the first device 210 from the audio data acquired and encoded by the second device 230, "first" and "second" may be indicated.

Steps 519-1 and 519-2 may be performed simultaneously, or at similar time points.

In step 521, the second device 230 transmits audio data (e.g., second audio data) to the first device 210 through the second communication link 403. The second device 230 may include an index number in the audio data acquired from the second microphone 333 at the same time point that the first device 210 acquires audio data, and transmit the same to the first device 210.

In step 523, the first device 210 may synchronize the second audio data received from the second device 230 with first audio data. An audio signal acquired and encoded by the first device 210 may refer to the first audio data. In the relay scheme, the second device 230 cannot communicate directly with the electronic device 101, and thus, the first device 210 may transmit the second audio data on behalf of the second device 230. The first device 210 may synchronize the first audio data with the second audio data, based on the index number included in each audio data. The first device 210 may synchronize audio data having the same index number. Alternatively, when synchronization of audio data is performed by the electronic device 101, step 523 may be omitted.

In step 525, the first device 210 transmits the synchronized audio data through the first communication link 401. The synchronized audio data may include the first audio data and the second audio data having the same index number.

In step 527, the electronic device 101 may synchronize the audio data. That is, when step 523 is performed, step 527 may be omitted. The electronic device 101 may store the first audio data and the second audio data in a memory. The electronic device 101 may decode the first audio data and the second audio data through an audio decoder and generate a stereo audio signal. An input of the audio decoder may correspond to bitstreams encoded by the first device 210 and the second device 230 at the same time point through synchronization adjustment. The generated stereo audio signal may be processed and output through a speaker.

The electronic device 101 may compensate audio data lost according to wireless transmission. An index number included in each audio data may sequentially increase (e.g., Index=0, 1, 2, 3, 4, 5) as an audio frame is encoded. Thus, when an index number is missing, the missing number can be identified through a frame index value. For example, when a frame index of audio data is "0, 1, 2, 4, 5", the electronic device 101 may determine that the third frame is missing. The electronic device 101 may generate (or compensate) the third frame, based on the second frame or the fourth frame.

Audio data may be transmitted through a Bluetooth™ packet, and a sequence number may be included in the Bluetooth™ packet. Similar to the frame number, the sequence number may also sequentially increase as the Bluetooth™ packet is transmitted. The electronic device 101 may generate the missing frame, based on a sequence number of the Bluetooth™ packet through which the audio data is transmitted.

FIG. 6 illustrates a transmission buffer state of a wearable device according to an embodiment.

Referring to FIG. 6, a wearable device including a first device and a second device may acquire a microphone input signal from a microphone included in each of the first device and the second device. In a first transmission environment 610 (e.g., while a transmission environment is good), the microphone input signal may be transferred to a microphone input buffer 601, and may be stored up to a first buffer level 611. The microphone input signal stored in the microphone input buffer 601 may be transferred to an audio encoder 603 to be encoded. The encoded audio signal may be input to an output buffer 605 (or a transmission buffer). The audio signal stored in the output buffer 605 may be transmitted through an audio bitstream (or an audio packet). In the first transmission environment 610, the audio signal may be stored up to a first threshold value 613 in the output buffer 605. The first transmission environment 610 corresponds to a normal transmission environment having no sound cutoff, wherein the microphone input buffer 601 or the output buffer 605 may output the audio data while always maintaining a constant buffer level (e.g., the first buffer level 611 or the first threshold value 613).

In a second transmission environment 650 (e.g., while a transmission environment is poor), a microphone input signal may be transferred to a microphone input buffer 601, stored up to a first buffer level 611, and transferred to an audio encoder 603 to be encoded. The encoded audio signal may be stored in an output buffer 605, wherein in the second transmission environment 650, the audio signal may be stored in the output buffer 605 while exceeding a second threshold value 651. The first device or the second device may determine the size of audio data according to a bit rate, wherein the bigger the size of the audio data is, the better the quality of the audio. Even in a case where the transmission environment is not good, when the size of the audio data is reduced, a sound cutoff may occur.

The second transmission environment 650 corresponds to a weak electric field situation, wherein packet transmission fails to be smoothly performed, packet missing repeatedly occurs, and thus, continuous attempts to perform retransmission may be made. In this case, the audio data stored in the microphone input buffer 601 or the output buffer 605 may not successfully output, and may be piled in the microphone input buffer 601 or the output buffer 605. When the audio signal is stored in the output buffer 605 while exceeding a second threshold value 651, the first device or the second device may determine that the transmission environment is poor, and reduce the size of the audio data stored in the output buffer 605 by reducing the bit rate. For example, the higher the bit rate is, the bigger the size of the audio data is, and the lower the bit rate is, the smaller the size of the audio data is. The first device or the second device may determine a first bit rate in the first transmission environment 610, and may determine a second bit rate, which is lower than the first bit rate, in the second transmission environment 650.

The first device or the second device may select a packet type that is advantageous for transmission, based on the size of the audio data. The first device or the second device can perform data communication smoothly even in the second transmission environment 650, and prevent the microphone input buffer 601 or the output buffer 605 from overflowing. When the buffer level of the microphone input buffer 601 or the output buffer 605 returns to a normal state (e.g., the first buffer level 611 or the first threshold value 613) as the transmission environment gets better, the first device or the second device may adjust the bit rate to increase the same again.

For a TWS-type wearable device including a first device and a second device separated into left and right parts, respectively, when the first device and the second device perform encoding at different bit rates, a user may experience inconvenience in matching between the first device and the second device. Accordingly, when the transmission environment of the first device or the second device exceeds a second threshold value 651, both the first device and the second device may lower the bit rates.

FIG. 6 illustrates that in the second transmission environment 650, the microphone input signal is stored up to the first buffer level 611 in the microphone input buffer 601, but the microphone input signal may be also stored in the microphone input buffer 601 while exceeding the first buffer level 611. When the microphone input signal is stored in the microphone input buffer 601 while exceeding the first buffer level 611, the first device or the second device may determine that the transmission environment is poor.

Figure 7:
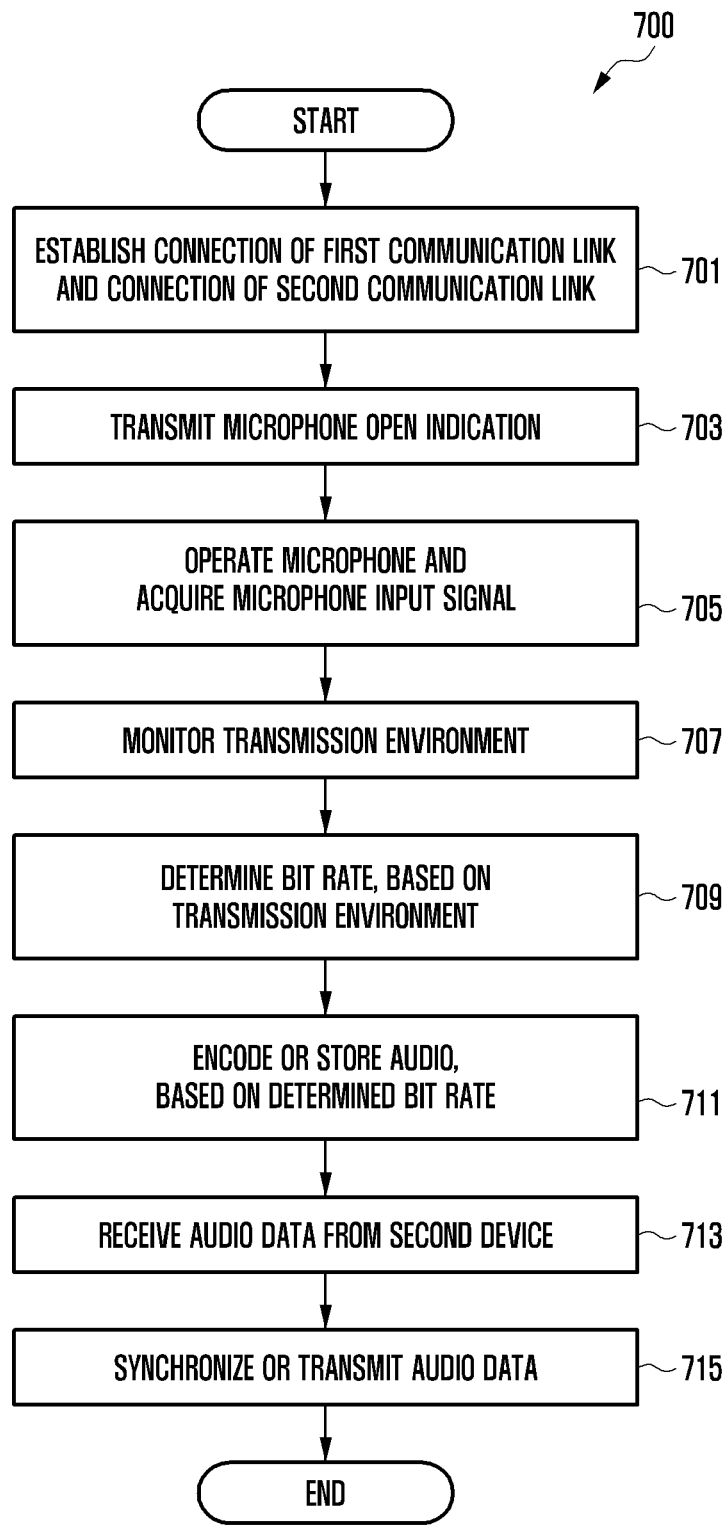
FIG. 7 is a flowchart illustrating an audio processing method by a first device of a wearable device according to an embodiment.

FIG. 7 is a flowchart illustrating an audio processing method a first device of a wearable device according to an embodiment. For example, FIG. 7 will be described below with reference to the electronic device 101 and the wearable device including the first device 210 and the second device 230 as illustrated in FIG. 4A.

Referring to FIG. 7, in step 701, a first processor included in the first device 210 establishes a first communication link (e.g., the first communication link 401) with the electronic device 101 through a communication module, and establishes a second communication link (e.g., the second communication link 403) with the second device 230. The first communication link 401 and the second communication link 403 may correspond to different links (or channels) or different communication schemes.

In step 703, the first processor transmits a microphone open indication to the second device 230. When receiving a recording request from a user, the electronic device 101 may transmit a recoding indication to the first device 210 through the first communication link 401. For example, when a user input of executing an application for recording and selecting (or pressing) a recording button is received, the electronic device 101 may transmit the recording indication to the first device 210. The first processor may transmit a microphone open indication to the second device 230 through the second communication link 403 upon the reception of the recording indication from the electronic device 101.

In step 705, the first processor may operate a first microphone to acquire a microphone input signal. The first processor may transmit the microphone open indication and operate the first microphone after a predetermined time. The first processor may acquire a microphone input signal through the first microphone. The microphone input signal may be stored in a microphone input buffer.

In step 707, the first processor may monitor (or analyze) a transmission environment. For example, the first processor and the second device 230 may exchange transmission buffer states or signal strengths (e.g., RSSI) with each other. The transmission buffer state may include a current residual buffer space of a controller transmission buffer of a transmission device (e.g., the first device 210 and the second device 230). The first processor may identify a packet transmission situation between the first device 210 and the second device 230, based on a residual buffer space of the first device 210 and a residual buffer space of the second device 230. The controller transmission buffer may correspond to an output buffer for storing an audio signal (or audio data) encoded by an audio encoder or a microphone input buffer.

In step 709, the first processor determines a bit rate, based on the transmission environment. When the transmission buffer state has a value that is less than or equal to a first threshold value or the signal strength exceeds a signal threshold value, the first processor may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the first processor may determine that the transmission environment corresponds to a weak electric field (e.g., a state in which the transmission environment is poor), and determine a second bit rate. The first bit rate may be greater than the second bit rate. When the bit rate is determined, the first processor may determine a packet type, based on the determined bit rate.

In the Bluetooth™ standard, various profiles are defined according to various usages, and an advanced audio distribution profile (A2DP) can be used for audio signal transmission in general. A2DP, as a profile for transmitting a high-quality audio signal, may transmit audio data by using a packet, and select a proper packet type according to the size of the transmitted audio data. Each packet type may have different numbers of time slots to be used, For example, packet type "2-DH3" may use three time slots, and 2-DH5" packet type may use five time slots. One time slot may correspond to 625 μsec. There is lower probability that an error occurs in a packet type using a smaller number of time slots, than compared to a packet type using a large number of time slots. The packet type using a smaller number of time slots may have more retransmissions occasions in the same transmission period, and thus, can be robust against a transmission error.

For example, if an audio signal is transmitted in a 20 msec unit, 20 msec may have 32 time slots (e.g., 625 usec*32=20 msec). In a case of "2-DH3" packet type, there may be eight transmission occasions during 20 msec. In a case of "2-DH5", there may be five transmission occasions during 20 msec. When an error (or a miss) occurs in the packet transmission, "2-DH3" packet type having more retransmission occasions than "2-DH5" packet type, and may have characteristics of being robust against the error. Considering the description above, when the transmission environment is good, the first processor may select a packet type such as 2-DH5 and 3-DH5, based on a bit rate, so as to transmit a large amount of audio data and provide a high-quality service. When the transmission environment is poor, the first processor may select a packet type such as "2-DH3", based on a bit rate, so as to reduce the amount of transmitted audio data and minimize sound cutoff even though the quality of a sound is degraded.

There may be one or more threshold values related to the transmission buffer state, and different bit rates may be determined based on the respective threshold values. There may be one or more signal threshold values related to the signal strength, and different bit rates may be determined based on the respective signal threshold values. When the transmission environment based on the transmission buffer state is different from the transmission environment based on the signal strength, a bit rate may be determined by prioritizing the transmission environment based on the transmission buffer state. Alternatively, the bit rate may be determined based on a corresponding threshold value among one or more threshold values according to the transmission buffer state and a corresponding threshold value among one or more threshold values according to the signal strength.

For example, when the transmission buffer state has a value that is less than or equal to a first threshold value, and the signal strength is lower than a signal threshold value, a transmission environment according to the transmission buffer state may be different from a transmission environment according to the signal strength. When the transmission environment according to transmission buffer state is different from the transmission environment according to the signal strength, the first processor may determine a first bit rate, based on the transmission buffer state. When the transmission environment according to the transmission buffer state is different from the transmission environment according to the signal strength, the first processor may determine a bit rate, based on the signal strength. Alternatively, a threshold value corresponding to the transmission buffer state may be classified as a first threshold value or a second threshold value that is greater than the first threshold value.

When the transmission buffer state has a value that is less than or equal to the first threshold value and the signal strength is less than or equal to a signal threshold, the first processor may determine a first bit rate, based on the transmission buffer state. Alternatively, when the transmission buffer state has a value between the first threshold value and the second threshold value, and the signal strength is less than or equal to a signal threshold value, the first processor may determine a second bit rate. When the transmission buffer state has a value exceeding the second threshold value and the signal strength is less than or equal to a signal threshold value, the first processor may determine a third bit rate. The first bit rate may be greater than the second bit rate, and the second bit rate may be greater than the third bit rate.

A threshold value corresponding to the signal strength may be classified as a first signal threshold value or a second signal threshold value that is greater than the first signal threshold value. When the transmission buffer state has a value that is less than or equal to the first threshold value, and the signal strength exceeds the second signal threshold value, the first processor may determine a first bit rate. However, when the transmission buffer state has a value between the first threshold value and the second threshold value and the signal strength is between the first signal threshold value and the second signal threshold value, the first processor may determine a second bit rate. When the transmission buffer state exceeds the second threshold value and the signal strength is less than or equal to the first signal threshold value, the first processor may determine a third bit rate. The first bit rate may be greater than the second bit rate, and the second bit rate may be greater than the third bit rate.

When the transmission environment of the first device 210 is different from the transmission environment of the second device 230, a bit rate may be determined based on a device having a poor transmission environment. For example, when the transmission environment of the first device 210 corresponds to a strong electric field situation and the transmission environment of the second device 230 corresponds to a weak strong electric field, the first processor may determine a bit rate, based on the weak electric field situation. When the transmission environment of the first device 210 corresponds to a weak electric field situation, and the transmission environment of the second device 230 corresponds to a strong electric field situation, the first processor may determine bit rate, based on the weak electric field situation.

In the relay scheme of FIG. 4A, a bit rate may be determined by prioritizing the transmission environment of the first device 210. For example, when the transmission environment of the first device 210 corresponds to a strong electric field situation and the transmission environment of the second device 230 corresponds to a weak electric field situation, the first processor may determine a bit rate, based on the strong electric field situation. When the transmission environment of the first device 210 corresponds to a weak electric field situation and the transmission environment of the second device 230 corresponds to a strong electric field situation, the first processor may determine a bit rate, based on the weak electric field situation.

In step 711, the first processor may encode or store the audio, based on the determined bit rate. The first processor may encode the microphone input signal at the determined bit rate, and store the encoded audio data in the output buffer. The size of the audio data may be determined according to the bit rate, wherein the bigger the size of the audio data is, the better the quality of the audio is. The first processor may encode the microphone input signal through an audio encoder, based on the determined bit rate. The audio data obtained by encoding and storing the microphone input signal acquired through the first microphone of the first device 210 may be referred to as "first audio data", a "first audio bitstream", or a "first audio packet".

For audio data encoded at the same time point at which the second device 230 performs encoding, the first processor may assign the same index number (or index value) as that of the second device 230. The index number may be positioned within the encoded audio data (or bitstream), or may be included in a header of the transmitted audio packet.

In step 713, the first processor receives audio data (e.g., second audio data) from the second device 230 through the second communication link 403. The second device 230 may encode the microphone input signal at the determined bit rate, and store the encoded audio data in the output buffer. The second device 230 may transmit the second audio data stored in the output buffer to the first device 210.

In step 715, the first processor may synchronize or transmit the audio data. The first processor may synchronize the first audio data encoded and stored in step 711 with the second audio data received in step 713. The first processor may synchronize the first audio data and the second audio data, based on an index number included in each audio data. The first processor may synchronize the first audio data and the second audio data having the same index number. The first processor may transmit the synchronized audio data in the electronic device 101 through the first communication link 401.

Alternatively, the first processor may transmit, to the electronic device 101, the first audio data encoded and stored in step 711 and the second audio data received in step 713, without synchronizing the first audio data with the second audio data. When the first audio data and the second audio data are not synchronized with each other, the synchronization may be performed by the electronic device 101.

Figure 8:
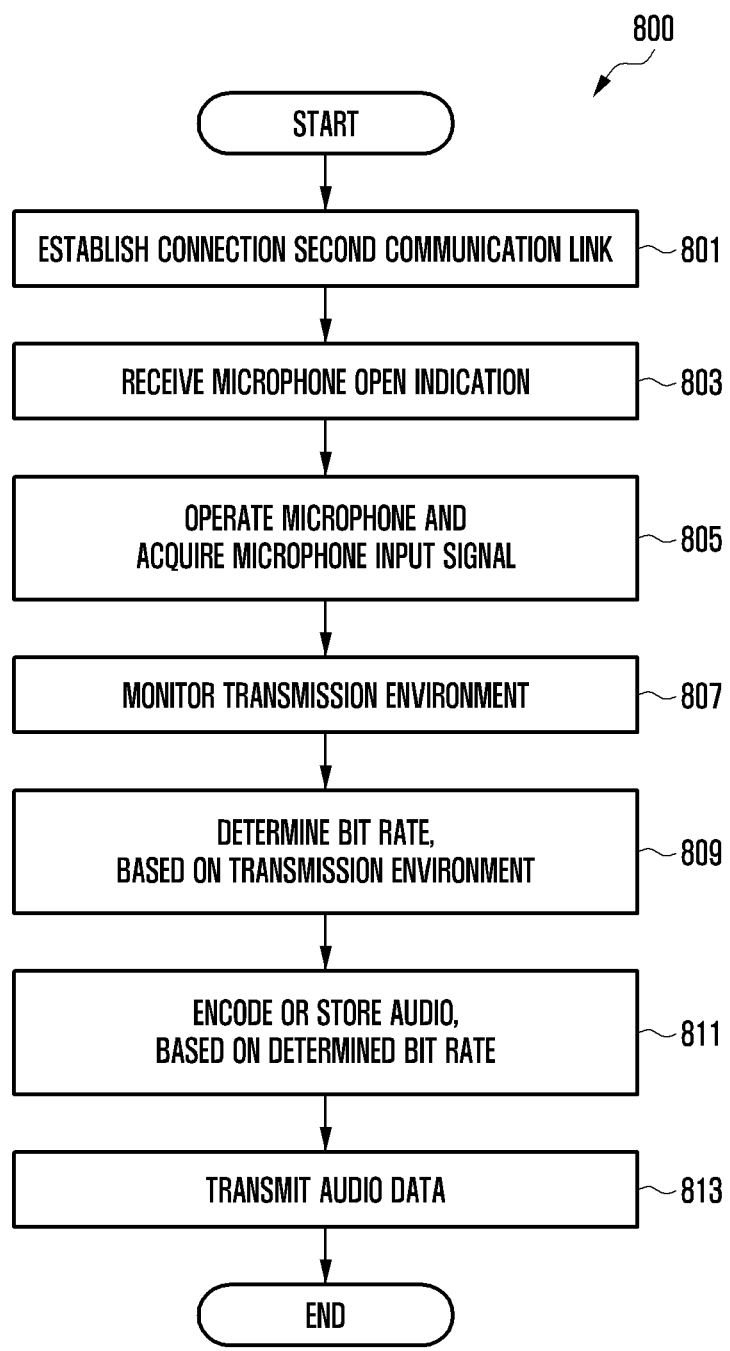
FIG. 8 is a flowchart illustrating an audio processing method by a second device of a wearable device according to an embodiment.

FIG. 8 is a flowchart illustrating an audio processing method by a second device of a wearable device according to an embodiment. For example, FIG. 8 will be described below with reference to the electronic device 101 and the wearable device including the first device 210 and the second device 230 as illustrated in FIG. 4A.

Referring to FIG. 8, in step 801, a second processor included in the second device 230 establishes a second communication link (e.g., the second communication link 403) with the first device 210 through a communication module.

In step 803, the second processor receives a microphone open indication from the first device 210 through the second communication link 403. When receiving a recording request, the electronic device 101 may transmit a recording indication to the first device 210 through the first communication link 401. The first device 210 may transmit a microphone open indication to the second device 230 through the second communication link 403 upon the reception of the recording indication from the electronic device 101.

In step 805, the second processor operates a second microphone to acquire a microphone input signal. The second processor may receive the microphone open indication and operate the second microphone after a predetermined time. The second processor may acquire a second microphone input signal through the second microphone. The second microphone input signal may be stored in a microphone input buffer.

In step 807, the second processor monitors (or analyzes) a transmission environment. For example, the second processor and the first device 210 may exchange transmission buffer states or signal strengths (e.g., RSSI) with each other. The transmission buffer state may include a current residual buffer space of a controller transmission buffer of a transmission device (e.g., the first device 210 and the second device 230). The second processor may identify a packet transmission situation between the first device 210 and the second device 230, based on a residual buffer space of the first device 210 and a residual buffer space of the second device 230. The controller transmission buffer may include an output buffer for storing an audio signal (or audio data) encoded by an audio encoder or a microphone input buffer.

In step 809, the second processor determines a bit rate, based on the transmission environment. When the transmission buffer state has a value that is less than or equal to a first threshold value or the signal strength exceeds a signal threshold value, the second processor may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the second processor may determine that the transmission environment corresponds to a weak electric field (e.g., a state in which the transmission environment is poor), and determine a second bit rate. The first bit rate may be greater than the second bit rate. When the bit rate is determined, the second processor may determine a packet type, based on the determined bit rate.

There may be one or more threshold values related to the transmission buffer state, and different bit rates may be determined based on the respective threshold values. There may be one or more signal threshold values related to the signal strength, and different bit rates may be determined based on the respective signal threshold values. When the transmission environment based on the transmission buffer state is different from the transmission environment based on the signal strength, a bit rate may be determined by prioritizing the transmission environment based on the transmission buffer state. Alternatively, the bit rate may be determined based on a corresponding threshold value among one or more threshold values according to the transmission buffer state and a corresponding threshold value among one or more threshold values according to the signal strength.

When a transmission environment of the first device 210 is different from a transmission environment of the second device 230, a bit rate may be determined based on a device having a poor transmission environment. For example, when the transmission environment of the first device 210 corresponds to a strong electric field situation and the transmission environment of the second device 230 corresponds to a weak strong electric field, the second processor may determine a bit rate, based on the weak electric field situation. When the transmission environment of the first device 210 corresponds to a weak electric field situation, and the transmission environment of the second device 230 corresponds to a strong electric field situation, the second processor may determine bit rate, based on the weak electric field situation.

Step 809 is similar if not identical to step 709 in FIG. 7, and thus, a more detailed description thereof is omitted.

In step 811, the second processor encodes and/or stores the audio, based on the determined bit rate. The second processor may encode the second microphone input signal at the determined bit rate, and store the encoded second audio data in the output buffer. The size of the audio data may be determined according to the bit rate, wherein the bigger the size of the audio data is, the better the quality of the audio is. The second processor may encode the second microphone input signal through an audio encoder, based on the determined bit rate. The audio data obtained by encoding and storing the second microphone input signal acquired through the second microphone of the second device 230 may be referred to as "second audio data", a "second audio bitstream", or a "second audio packet".

For audio data encoded at the same time point at which the first device 210 encodes audio data, the second processor may assign the same index number (or index value) as that of the first device 210. The index number may be positioned within the encoded audio data (or bitstream), or may be included in a header of the transmitted audio packet.

In step 813, the second processor receives audio data (e.g., second audio data) from the first device 210 through the second communication link 403. The second processor may store the second audio data encoded and stored in step 811 in the output buffer, and transmit the same to the first device 210. In the relay scheme of FIG. 4A, the second device 230 is not connected directly to the electronic device 101, and thus, the second audio data can be transmitted to the electronic device 101 through the first device 210.

Figure 9:
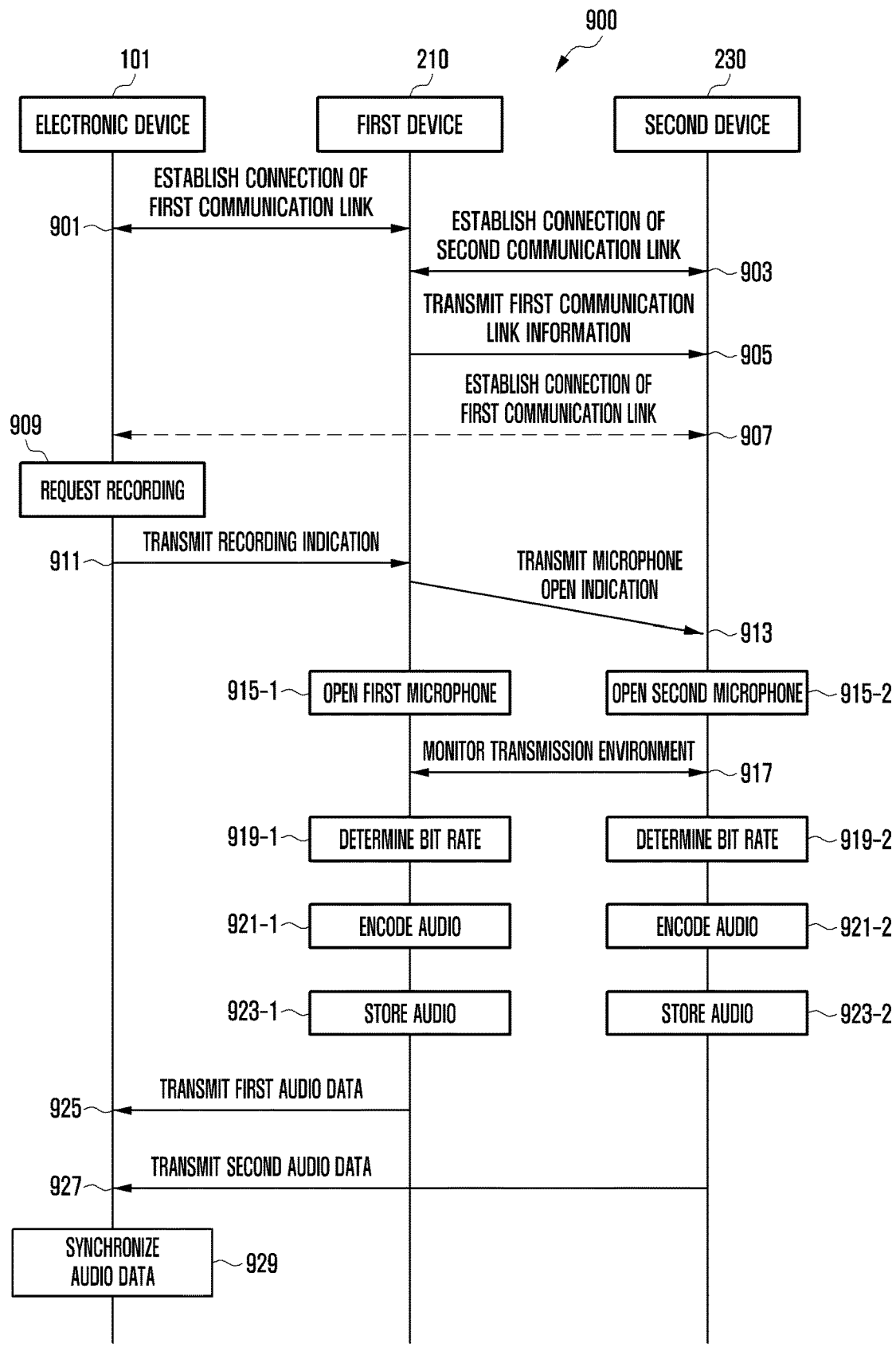
FIG. 9 is a signal flow diagram illustrating operations between an electronic device and a wearable device according to an embodiment.

FIG. 9 is a signal flow diagram illustrating operations between an electronic device and a wearable device according to an embodiment. For example, FIG. 9 will be described below with reference to the electronic device 101 and the wearable device including the first device 210 and the second device 230 as illustrated in FIG. 4B.

Referring to FIG. 9, in step 901, the electronic device 101 establishes (or forms) a first communication link (e.g., the first communication link 401) with the first device 210. The first communication link 401 may be short-distance wireless communication such as Bluetooth™ or BLE.

In step 903, the first device 210 establishes (or forms) a second communication link (e.g., the second communication link 403) with the second device 230. The second communication link 403 may be different from the first communication link 401, or a link utilizing a different communication scheme than the first communication link 401.

In step 905, the first device 210 transmits first communication link information to the second device 230 through the second communication link 403. The first communication link information includes information for connection of the first communication link 401, and may include a Bluetooth™ address, FHS packet information, or a link key.

In step 907, the second device 230 establishes a first communication link (e.g., the $(1\text{-}1)^{th}$ communication link 401-1) with the electronic device 101, based on the first communication link information. The first communication link 401 and the $(1\text{-}1)^{th}$ communication link 401-1 may correspond to the same channel or the same communication scheme. The second device 230 may receive (e.g., perform sniffing of) information (e.g., a packet) transmitted or received between the first device 210 and the electronic device 101 through the $(1\text{-}1)^{th}$ communication link 101402-1. The electronic device 101 may recognize, as the same device, the first device 210 connected through the first communication link 401 and the second device 230 connected through the $(1\text{-}1)h$ communication link 401-1.

In step 909, the electronic device 101 receives a recording request from a user. For example, when a user input of executing an application for recording and selecting (or pressing) a recording button is received, the electronic device 101 may determine that the recording request has been received.

In step 911, the electronic device 101 transmits a recording indication to the first device 210 based on the recording request. The electronic device 101 may transmit the recording indication to the first device 210 through the first communication link 401.

In step 913, the first device 210 transmits a microphone open indication to the second device 230 based on the recording indication. The microphone open indication may include a command to acquire audio by operating (or opening) a microphone. For example, the microphone open indication may cause the microphone to operate after a predetermined time once the microphone open indication is received.

In step 915-1, the first device 210 opens (or operates) a first microphone. The first device 210 may transmit the microphone open indication, and operate the first microphone after a predetermined time to acquire audio at the same time point as the second device 230. The first device 210 may acquire (or receive) the audio through the first microphone.

In step 915-2, the second device 230 opens (or operates) a second microphone. The second device 230 may receive the microphone open indication, and operate the second microphone after a predetermined time to acquire audio at the same time point as the first device 210. The second device 230 may acquire (or receive) the audio through the second microphone.

Steps 915-1 and 915-2 may be simultaneously performed.

In step 917, the first device 210 and the second device 230 monitor (or analyze) a transmission environment. For example, the first device 210 and the second device 230 may exchange transmission buffer states or signal strengths with each other. The transmission buffer state may include a current residual buffer space of a controller transmission buffer of a transmission device (e.g., the first device 210 and the second device 230). The signal strength may include a signal strength (e.g., an RSSI) measured by the first device 210 or a signal strength measured by the second device 230. While the first device 210 and the second device 230 or the first device 210 and the electronic device 101 are close to each other, the signal strength may exceed a signal threshold value (e.g., a transmission state is good). However, while the first device 210 and the second device 230 or the first device 210 and the electronic device 101 are far from each other, the signal strength may be less than or equal to the signal threshold value (e.g., a transmission state is poor). The first device 210 and the second device 230 may share transmission environments with each other.

Since step 917 is similar to step 513 in FIG. 5, which has already been described above, a more detailed description of step 917 omitted.

In step 919-1, the first device 210 determines a bit rate, based on the monitored transmission environment. When the transmission buffer state has a value that is less than or equal to a first threshold value or the signal strength exceeds a signal threshold value, the first device 210 may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the first device 210 may determine that the transmission environment corresponds to a weak electric field (e.g., a state in which the transmission environment is poor), and determine a second bit rate. The first bit rate may be greater than the second bit rate. When the bit rate is determined, the first device 210 may determine a packet type, based on the determined bit rate.

In step 919-2, the second device 230 determines a bit rate, based on the monitored transmission environment. When the transmission buffer state has a value that is less than or equal to a first threshold value or the signal strength exceeds a signal threshold value, the second device 230 may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the second device 230 may determine that the transmission environment corresponds to a weak electric field (e.g., a state in which the transmission environment is poor), and determine a second bit rate. The first bit rate may be greater than the second bit rate. When the bit rate is determined, the second device 230 may determine a packet type, based on the determined bit rate.

Steps 919-1 and 919-2 may be performed simultaneously, or at similar time points.

In step 921-1, the first device 210 encodes the audio (e.g., a microphone input signal) acquired through the first microphone. The first device 210 may encode the microphone input signal at the determined bit rate. The first device 210 may synchronize a microphone input with that of the second device 230 through the second communication link 403. The synchronized microphone input signal may be encoded through an audio encoder of the first device 210, and for audio data encoded at the same time point, the first device 210 may assign the same index number (or index value) as that of the second device 230. The index number may be positioned within the encoded audio data (or bitstream), or may be included in a header of the transmitted audio packet.

In step 921-2, the second device 230 encodes the audio acquired through the second microphone. The second device 230 may encode the microphone input signal at the determined bit rate. The second device 230 may synchronize a microphone input with that of the first device 210 through the second communication link 403. The synchronized microphone input signal may be encoded through an audio encoder of the second device 230, and for audio data encoded at the same time point, the second device 230 may assign the same index number (or index value) as that of the first device 210. The index number may be positioned within the encoded audio data (or bitstream), or may be included in a header of the transmitted audio packet.

Steps 921-1 and 921-2 may be performed simultaneously, or at similar time points.

In step 923-1, the first device 210 stores the encoded audio data in a first memory. The storing of the audio data in the first memory may include temporary storage in an output buffer before transmitting the same to the electronic device 101. The audio data output from the output buffer of the first device 210 may be referred to as "first audio data", a "first audio bitstream", or a "first audio packet".

In step 923-2, the second device 230 stores the encoded audio data in a second memory. The storing of the audio data in the second memory may include temporary storage in an output buffer before transmitting the same to the first device 210. The audio data output from the output buffer of the second device 230 may be referred to as "second audio data", a "second audio bitstream", or a "second audio packet".

In order to distinguish the audio data acquired and encoded by the first device 210 from the audio data acquired and encoded by the second device 230 herein, the terms "first" and "second" may be indicated.

Steps 923-1 and 923-2 may be performed simultaneously, or at similar time points.

In step 925, the first device 210 transmits the first audio data to the electronic device 101 through the first communication link 401. In the sniffing scheme of FIG. 4B, the second device 230 can communicate with the electronic device 101, and thus, the first device 210 may transmit its own first audio to the electronic device 101. The first device 210 may include an index number in the first audio data acquired from the first microphone at the same time point at which the second device 230 acquires the audio data, and transmit the same to the electronic device 101.

In step 927, the second device 230 transmits the second audio data to the electronic device 101 through the 401 $(1-1)^{th}$ communication link 401-1. The second device 230 may include an index number in the audio data acquired from the second microphone at the same time point at which the first device 210 acquires the audio data, and transmit the same to the electronic device 101.

Although FIG. 9 illustrates step 925 preceding step 927, according to a transmission environment of the first device 210 or the second device 230, step 927 may precede step 925. Alternatively, steps 925 and 927 may be simultaneously performed.

In step 929, the electronic device 101 synchronizes the audio data. The electronic device 101 may receive the first audio data and the second audio data through the first communication link 401. That is, the electronic device 101 may receive the first audio data from the first device 210 through the first communication link 401, and may receive the second audio data from the second device 230 through the $(1-1)^{th}$ communication link 101402-1. The electronic device 101 may synchronize the received first audio data and second audio data. The electronic device 101 may synchronize the first audio data with the second audio data, based on an index number included in each of the first audio data and the second audio data. Alternatively, the electronic device 101 may synchronize the first audio data with the second audio data, based on a sequence number included in a Bluetooth™ packet.

The electronic device 101 may decode the first audio data and the second audio data through an audio decoder and generate a stereo audio signal. An input of the audio decoder may correspond to bitstreams encoded by the first device 210 and the second device 230 at the same time point through synchronization adjustment. The generated stereo audio signal may be processed and stored in a memory, and/or output through a speaker.

Figure 10:
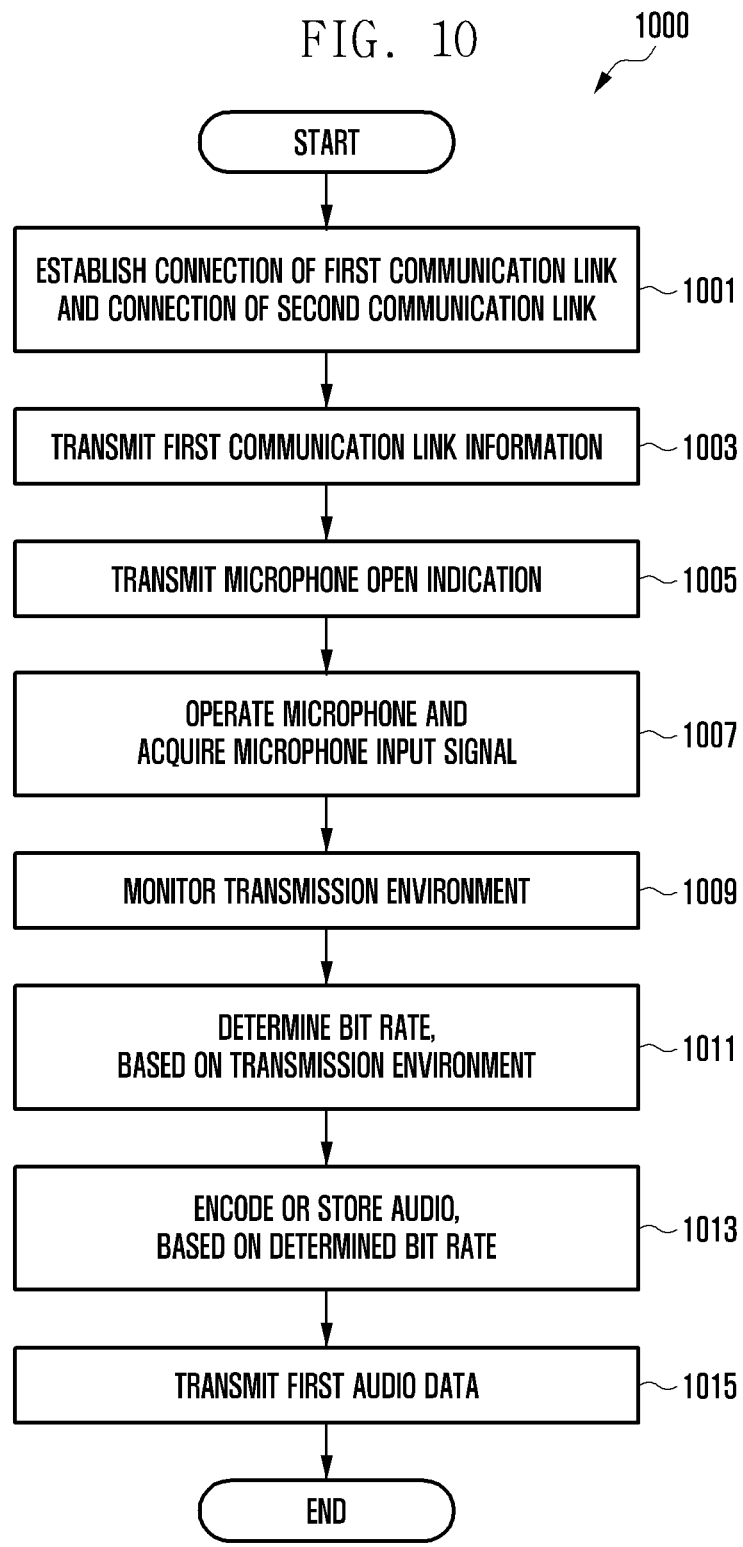
FIG. 10 is a flowchart illustrating an audio processing method by a first device of a wearable device according to an embodiment.

FIG. 10 is a flowchart illustrating an audio processing method by a first device of a wearable device according to an embodiment. For example, FIG. 10 will be described below with reference to the electronic device 101 and the wearable device including the first device 210 and the second device 230 as illustrated in FIG. 4B.

Referring to FIG. 10, in step 1001, a first processor included in the first device 210 establishes a first communication link (e.g., the first communication link 401) with the electronic device 101 through a communication module, and establishes a second communication link (e.g., the second communication link 403) with the second device 230.

In step 1003, the first device 210 transmits first communication link information to the second device 230 through the second communication link 403. The first communication link information includes information for connection of the first communication link 401, such as a Bluetooth™ address, FHS packet information, or a link key. The second device 230 may establish the $(1-1)^{th}$ communication link 1012-1 with the electronic device 101, based on the first communication link information.

In step 1005, the first processor transmits a microphone open indication to the second device 230. When a recording request is received from user, the electronic device 101 may transmit a recording indication to the first device 210 through the first communication link 401. For example, when a user input of executing an application for recording and selecting (or pressing) a recording button is received, the electronic device 101 may transmit the recording indication to the first device 210. The first processor may transmit a microphone open indication to the second device 230 through the second communication link 403 upon the reception of the recording indication from the electronic device 101.

In step 1007, the first processor operates a first microphone to acquire a microphone input signal (e.g., a first microphone input signal). The first processor may transmit the microphone open indication and operate the first microphone after a predetermined time. The first processor may acquire a first microphone input signal through the first microphone. The first microphone input signal may be stored in a microphone input buffer.

In step 1009, the first processor monitors (or analyzes) a transmission environment. For example, the first processor and the second device 230 may exchange transmission buffer states or signal strengths (e.g., RSSI) with each other. The transmission buffer state may include a current residual buffer space of a controller transmission buffer of a transmission device (e.g., the first device 210 and the second device 230). The first processor may identify a packet transmission situation between the first device 210 and the second device 230, based on a residual buffer space of the first device 210 and a residual buffer space of the second device 230. The controller transmission buffer may correspond to an output buffer for storing an audio signal (or audio data) encoded by an audio encoder or a microphone input buffer 601. Operation 1009 may be identical or similar to operation 707 in FIG. 7.

In step 1011, the first processor determines a bit rate, based on the transmission environment. When the transmission buffer state has a value that is less than or equal to a first threshold value or the signal strength exceeds a signal threshold value, the first processor may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the first processor may determine that the transmission environment corresponds to a weak electric field (e.g., a state in which the transmission environment is poor), and determine a second bit rate. The first bit rate may be greater than the second bit rate.

When the bit rate is determined, the first processor may determine a packet type, based on the determined bit rate. Operation 1011 may be identical or similar to operation 709 in FIG. 7, and thus, the detailed description thereof may be omitted.

In step 1013, the first processor encodes and/or stores the audio, based on the determined bit rate. The first processor may encode the first microphone input signal at the determined bit rate, and may store the encoded first audio data in the output buffer. The first processor may encode the first microphone input signal through an audio encoder, based on the determined bit rate. The audio data obtained by encoding and storing the first microphone input signal acquired through the first microphone of the first device 210 may be referred to as "first audio data", a "first audio bitstream", or a "first audio packet".

For the first audio data encoded at the same time point as the second device 230 performs encoding, the first processor may assign the same index number (or index value) as that of the second device 230. The index number may be positioned within the encoded audio data (or bitstream), or may be included in a header of the transmitted audio packet.

In step 1015, the first processor transmits the first audio data to the electronic device 101 through the first communication link 401. In the sniffing scheme of FIG. 4B, the second device 230 can communicate directly with the electronic device 101, and thus, the first device 210 only transmits its own first audio to the electronic device 101.

The electronic device 101 may synchronize the first audio data transmitted from the first device 210 with the second audio data transmitted from the second device 230. The electronic device 101 may synchronize the first audio data with the second audio data, based on an index number included in each of the first audio data and the second audio data.

Figure 11:
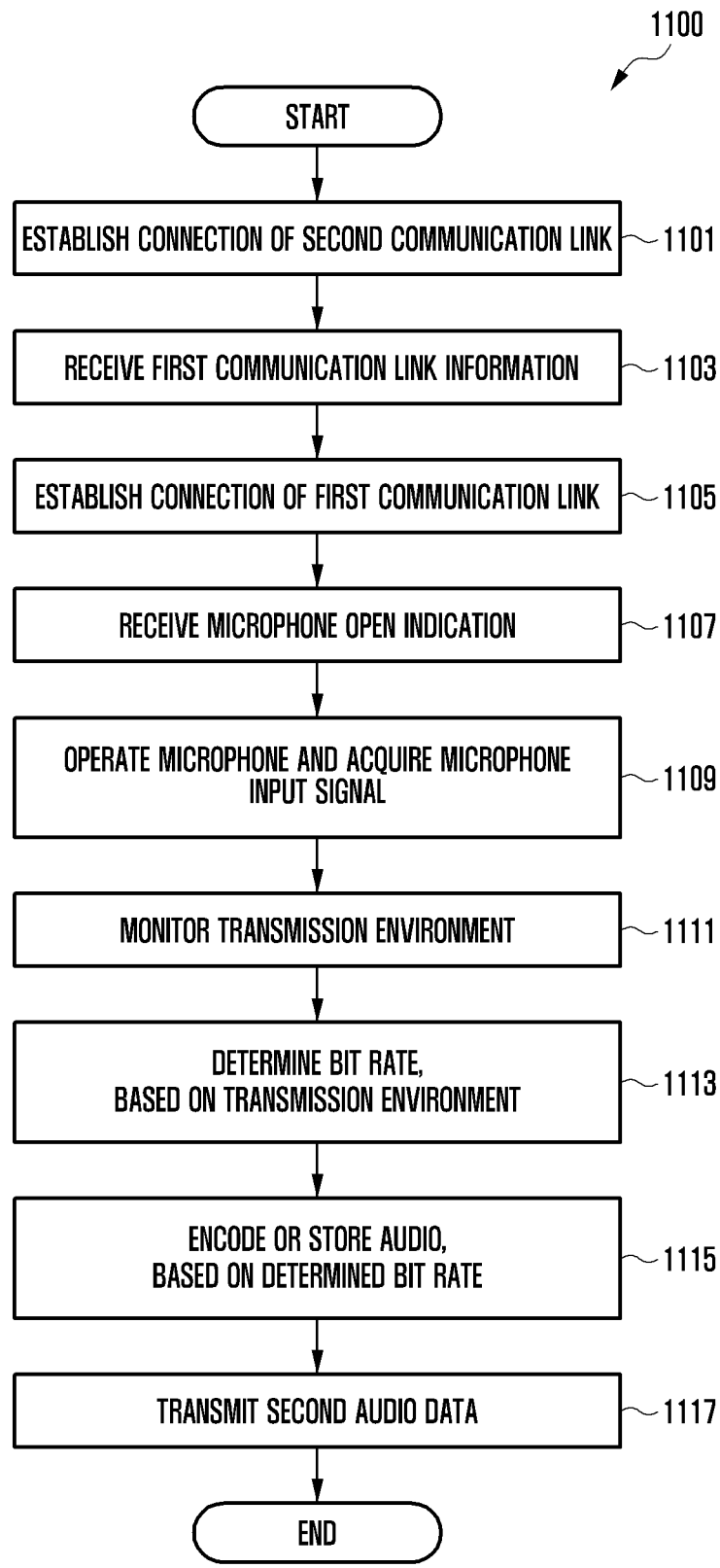
FIG. 11 is a flowchart illustrating an audio processing method by a second device of a wearable device according to an embodiment.

FIG. 11 is a flowchart illustrating an audio processing method by a second device of a wearable device according to an embodiment. For example, FIG. 11 will be described below with reference to the electronic device 101 and the wearable device including the first device 210 and the second device 230 as illustrated in FIG. 4B.

Referring to FIG. 11, in step 1101, a second processor included in the second device 230 establishes a second communication link (e.g., the second communication link 403) with the first device 210 through a communication module.

In step 1103, the second processor receives first communication link information from the first device 210 through the second communication link 403. The first communication link information includes information for connection of the first communication link 401, such as a Bluetooth™ address, FHS packet information, or a link key.

In step 1105, the second processor establishes the $(1\text{-}1)^{th}$ communication link 401-1 with the electronic device 101, based on the first communication link information. The first communication link 401 and the $(1\text{-}1)^{th}$ communication link 401-1 may correspond to the same channel or the same communication scheme. The second device 230 may receive (e.g., perform sniffing of) information (e.g., a packet) transmitted or received between the first device 210 and the electronic device 101 through the $(1\text{-}1)h$ communication link 401-1. The electronic device 101 may recognize, as the same device, the first device 210 connected through the first communication link 401 and the second device 230 connected through the $(1\text{-}1)^{th}$ communication link 401-1.

In step 1107, the second processor receives a microphone open indication from the first device 210 through the second communication link 403. When receiving a recording request, the electronic device 101 may transmit a recording indication to the first device 210 through the first communication link 401. The first device 210 may transmit a microphone open indication to the second device 230 through the second communication link 403 upon the reception of the recording indication from the electronic device 101.

In step 1109, the second processor operates a first microphone to acquire a microphone input signal (e.g., a second microphone input signal). The second processor may receive the microphone open indication and operate the second microphone after a predetermined time. The second processor may acquire a second microphone input signal through the second microphone. The second microphone input signal may be stored in a microphone input buffer.

In step 1111, the second processor monitors (or analyzes) a transmission environment. For example, the second processor and the first device 210 may exchange transmission buffer states or signal strengths (e.g., RSSI) with each other. The transmission buffer state may include a current residual buffer space of a controller transmission buffer of a transmission device (e.g., the first device 210 and the second device 230). The second processor may identify a packet transmission situation between the first device 210 and the second device 230, based on a residual buffer space of the first device 210 and a residual buffer space of the second device 230. The controller transmission buffer may correspond to an output buffer for storing an audio signal (or audio data) encoded by an audio encoder or a microphone input buffer.

In step 1113, the second processor determines a bit rate, based on the transmission environment. When the transmission buffer state has a value that is less than or equal to a first threshold value or the signal strength exceeds a signal threshold value, the second processor may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the second processor may determine that the transmission environment corresponds to a weak electric field (e.g., a state in which the transmission environment is poor), and determine a second bit rate. The first bit rate may be greater than the second bit rate.

When the bit rate is determined, the second processor may determine a packet type, based on the determined bit rate. Operation 1113 may be identical or similar to operation 809 in FIG. 8, and thus, the detailed description thereof may be omitted.

In step 1115, the second processor encodes and/or stores the audio, based on the determined bit rate. The second processor may encode the second microphone input signal at the determined bit rate, and store the encoded second audio data in the output buffer. The second processor may encode the second microphone input signal through an audio encoder, based on the determined bit rate. The audio data obtained by encoding and storing the second microphone input signal acquired through the second microphone of the second device 230 may be referred to as "second audio data", a "second audio bitstream", or a "second audio packet".

In step 1117, the second processor transmits the second audio data to the electronic device 101 through the $(1\text{-}1)^{th}$ communication link 401-1. The second processor may store the second audio data encoded and stored in step 1115 in the output buffer, and transmit the same to the first device 210. In the sniffing scheme of FIG. 4B, the second device 230 is directly connected to the electronic device 101, and thus, the second audio data can be directly transmitted to the electronic device 101.

FIG. 12 illustrates audio data transmitted from a wearable device according to an embodiment.

Referring to FIG. 12, a first device of a wearable device may generate first audio data 1201. The first audio data 1210 may correspond to data obtained by encoding a microphone input signal (e.g., the first microphone input signal) acquired through a first microphone included in the first device. The first audio data 1210 may include at least one of a sync word 1211, a cyclical redundancy check (CRC) 1213, an index number 1215, or frame payload 1 1217. The first audio data 1210 in FIG. 12 shows a field of a Bluetooth™ packet, the field corresponding to audio data. The sync word 1211 includes an identifier indicating the audio data. The CRC 1213 is a field for detecting an error of the audio data. The index number 1215 is assigned by the first device to a microphone input signal acquired at the same time point at which a second device acquires the signal. The frame payload 1 1217 may include an encoded audio signal.

The second device may generate second audio data 1230. The second audio data 1230 may be obtained by encoding a microphone input signal (e.g., second microphone input signal) acquired through a second microphone included in a second device. The second audio data 1230 includes at least one of a sync word 1231, a CRC 1233, an index number 1235, or a frame payload 2 1237. The sync word 1231 includes an identifier indicating the audio data. The CRC 1233 is a field for detecting an error of the audio data. The index number 1235 is assigned by the second device to a microphone input signal acquired at the same time point at which the first device acquires the signal. The frame payload 2 1237 may include an encoded audio signal.

Because the first audio data 1210 and the second audio data 1230 are generated as microphone input signals acquired at the same time point, the index number 1215 included in the first audio data 1210 may be identical to the index number 1235 included in the second audio data 1230. When a transmission environment is good, the index number 1215 included in the first audio data 1210 may be identical to the index number 1235 included in the second audio data 1230. However, when the transmission environment is poor (or in a crowded situation such as a situation in a subway), the index number 1215 included in the first audio data 1210 and the index number 1235 included in the second audio data 1230 may be transferred to an electronic device at different time slots. When the audio data generated at different time slots is transferred to the electronic device, left and right synchronization may not well-match. The first device or the electronic device may synchronize the audio data having the same index number. The electronic device may synchronize and decode audio data having the same index number to match the left and right synchronization.

Figure 13:
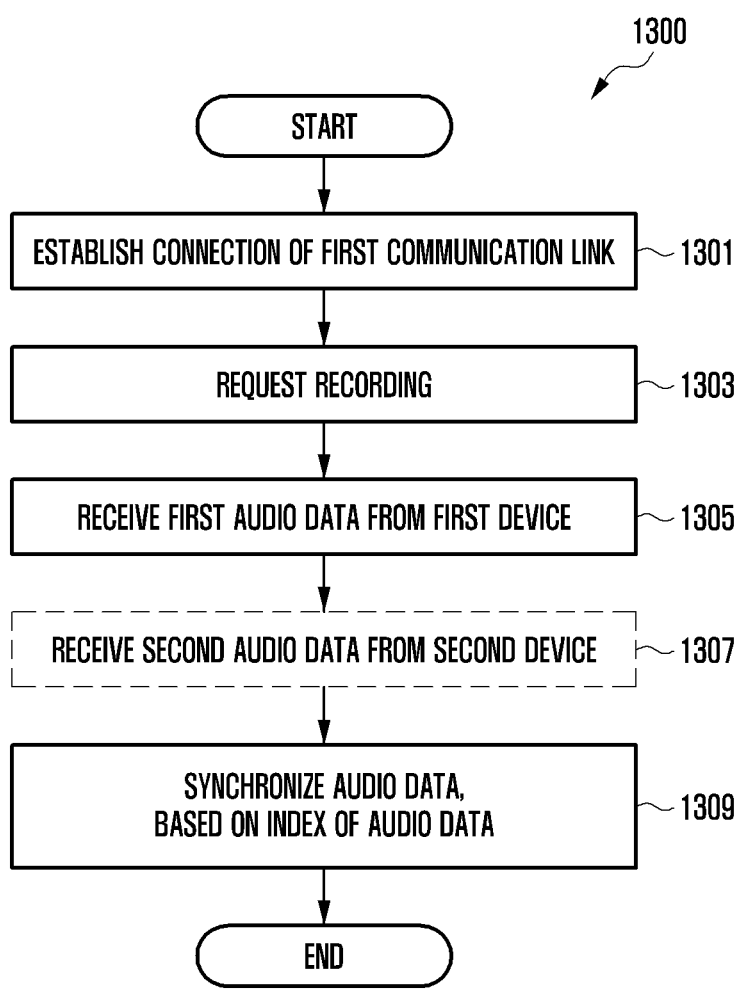
FIG. 13 is a flowchart illustrating a method for processing audio data by an electronic device according to an embodiment.

FIG. 13 is a flowchart illustrating a method for processing audio data by an electronic device according to an embodiment. For example, FIG. 13 will be described below with reference to the electronic device 101 and the wearable device including the first device 210 and the second device 230 as illustrated in FIGS. 4A to 4D.

Referring to FIG. 13, in step 1301, a processor of the electronic device 101 establishes (or forms) a first communication link (e.g., the first communication link 401 of FIGS. 4A to 4D) with the first device 210 through a communication module. The first communication link 401 may correspond to short-range wireless communication such as Bluetooth™ or BLE. In the relay scheme 210 of FIG. 4A, the processor may be connected to the first device 210 through the first communication link 401. In the sniffing scheme 230 of FIG. 4B, the processor may be connected to the first device 210 through the first communication link 401, and may form (or establish) the $(1\text{-}1)^{th}$ communication link 401-1 with the second device 230.

In step 1303, the processor requests recording. The processor may receive a recording request from a user and may request recording from (or indicate recording to) the first device 210 based on the recording request. When a user input of executing an application for recording and selecting (or pressing) a recording button is received, the processor may determine that the recording request has been received. Because the processor is connected to the first device 210 through the first communication link 401, the processor may transmit a recording indication to the first device 210.

In step 1305, the processor receives first audio data from the first device 210. In the relay scheme of FIG. 4A210, the first audio data may include audio data acquired from the first device 210 and the second device 230. In the sniffing scheme of FIG. 4B230, the first audio data may include audio data acquired from the first device 210.

In step 1307, the processor may receive second audio data from the second device 230. In the relay scheme of FIG. 4A210, step 1307 may be omitted, as the first audio data may include audio data acquired from the second device 230.

In step 1309, the processor synchronizes audio data, based on an index of the audio data. The processor may synchronize the first audio data and the second audio data, based on an index number included in each of the first audio data of the first device 210 and the second audio data of the second device 230. The processor may synchronize the first audio data and the second audio data having the same index number, and store the same in a memory. The processor may decode the first audio data and the second audio data through an audio decoder and generate a stereo audio signal. An input of the audio decoder may correspond to bitstreams encoded by the first device 210 and the second device 230 at the same time point through synchronization adjustment. The generated stereo signal may be processed and output through a speaker.

The processor may compensate audio data lost according to wireless transmission. An index number included in each audio data may sequentially increase (e.g., Index=0, 1, 2, 3, 4, 5) as an audio frame is encoded. When the index number is missing, the missing number can be identified through a frame index value. For example, when a frame index of audio data is "0, 1, 2, 4, 5", the processor may determine that the third frame is missing. The processor may generate (or compensate) the third frame, based on the second frame or the fourth frame.

The audio data is transmitted through a Bluetooth™ packet, and a sequence number may be included in the Bluetooth™ packet. Similar to the frame number, the sequence number may also sequentially increase as the Bluetooth™ packet is transmitted. The processor may generate the missing frame, based on a sequence number of the Bluetooth™ packet through which the audio data is transmitted.

Figure 14:
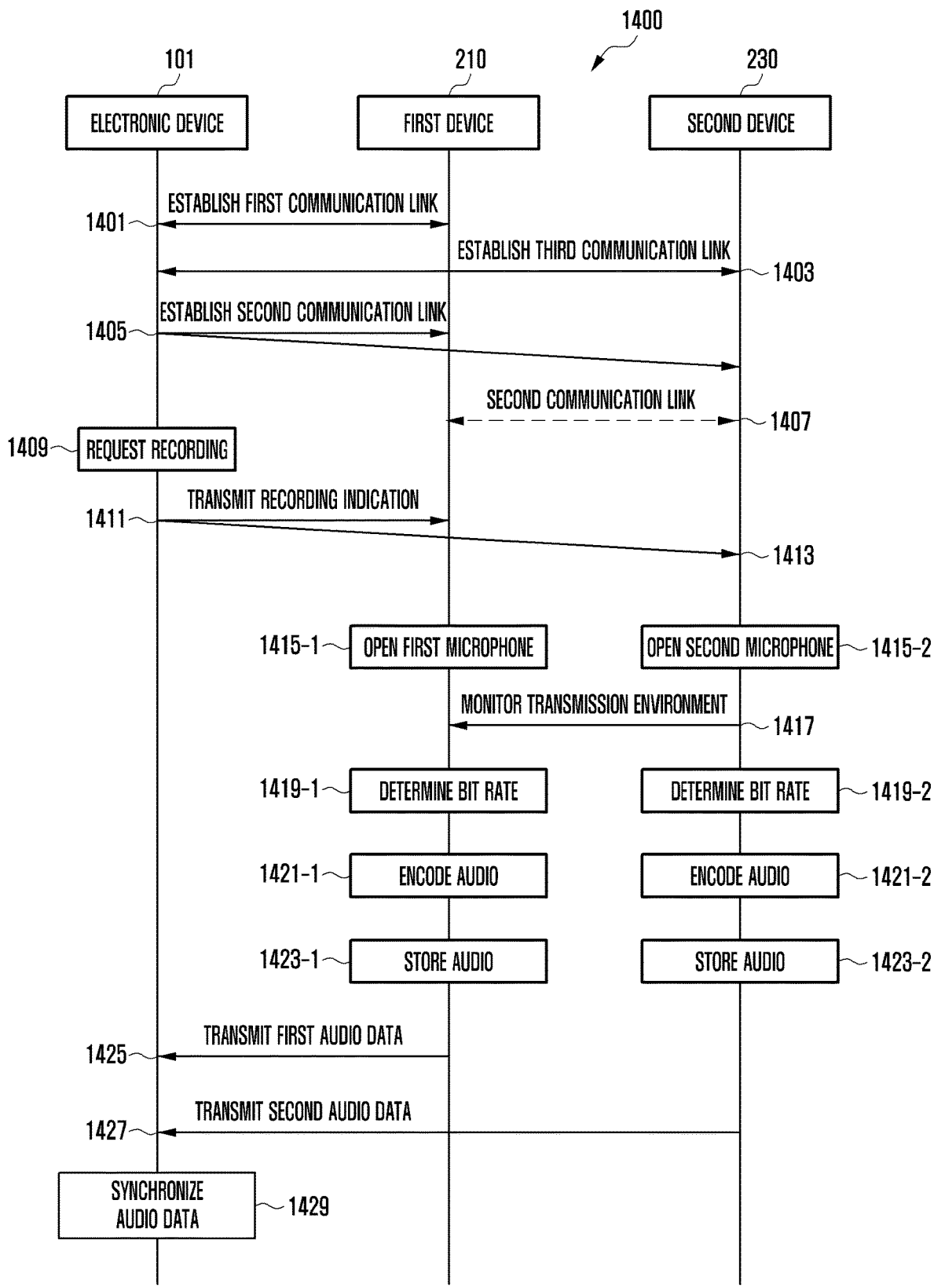
FIG. 14 is a signal flow diagram illustrating operations between an electronic device and a wearable device according to an embodiment.

FIG. 14 is a signal flow diagram illustrating operations between an electronic device and a wearable device according to an embodiment. For example, FIG. 14 will be described below with reference to the electronic device 101 and the wearable device including the first device 210 and the second device 230 as illustrated in FIG. 4C.

Referring to FIG. 14, in step 1401, the electronic device 101 establishes (or forms) a first communication link (e.g., the first communication link 401) with the first device 210. The first communication link 401 may include short-range wireless communication link such as Bluetooth™ or BLE.

In step 1403, the electronic device 101 establishes (or forms) a third communication link (e.g., the third communication link 405) with the second device 230. The third communication link 405 and the first communication link 401 may have the same or similar communication scheme.

Although FIG. 14 illustrates step 1101 preceding step 1403, step 1403 may precede step 1401, or steps 1101 and 1403 may be simultaneously performed.

In step 1405, the electronic device 101 requests a second communication link connection to the first device 210 and the second device 230. The electronic device 101 may transmit device information of the second device 230 to the first device 210, and may indicate the first device 210 to form a second communication link (e.g., the second communication link 403) with the second device 230. The electronic device 101 may transmit device information of the first device 210 to the second device 230, and may indicate the second device 230 to form the second communication link 403 with the first device 210.

In step 1407, the first device 210 and the second device 230 may form the second communication link 403. The first device 210 may form the second communication link 403 with the second device 230, based on the device information of the second device 230, received from the electronic device 101. The second device 230 may form the second communication link 403 with the first device 210, based on the device information of the first device 210, received from the electronic device 101. However, step 1407 may be omitted according to an embodiment In step 1409, the electronic device 101 receives a recording request from a user. For example, when a user input of executing an application for recording and selecting (or pressing) a recording button is received, the electronic device 101 may determine that the recording request has been received.

In step 1411, the electronic device 101 transmits a recording indication (or a microphone open indication) to the first device 210 based on the recording request. The electronic device 101 may transmit a recording indication to the first device 210 through the first communication link 401. The first device 210 may operate (or open) a microphone based on the recording indication to acquire audio. For example, the first device 210 may operate the microphone after a predetermined time has elapsed since the recording indication was received.

In step 1413, the electronic device 101 transmits the recording indication to the second device 230 based on the recording request. The electronic device 101 may transmit the recording indication to the second device 230 through the third communication link 405. The second device 230 may operate (or open) the microphone based on the recording indication to acquire audio.

Although FIG. 14 illustrates step 1411 preceding step 1413, steps 1411 and 1413 may be simultaneously performed, or step 1413 may precede step 1411. The description above is made to help understanding of the disclosure, and the disclosure is not limited to the description.

In step 1415-1, the first device 210 opens (or operates) a first microphone. The first device 210 may transmit the microphone open indication, operate the first microphone after a predetermined time, and acquire audio at the same time point as the second device 230. The first device 210 may acquire (or receive) the audio through the first microphone.

In step 1415-2, the second device 230 may open (or operate) a second microphone. The second device 230 may receive the microphone open indication, operate the second microphone after a predetermined time, and acquire the audio at the same time point as the first device 210. The second device 230 may acquire (or receive) the audio through the second microphone.

Steps 1415-1 and 1415-2 may be simultaneously performed.

In step 1417, the first device 210 and the second device 230 monitor (or analyze) a transmission environment. In order to monitor the transmission environment, the first device 210 and the second device 230 may exchange transmission buffer states or signal strengths with each other through the second communication link 403. The transmission buffer state may include a current residual buffer space of a controller transmission buffer of a transmission device (e.g., the first device 210 and the second device 230). The signal strength may include a signal strength (e.g., an RSSI) measured by the first device 210 or a signal strength measured by the second device 230. While the first device 210 and the second device 230 or the first device 210 and the electronic device 101 are close to each other, the signal strength may exceed a signal threshold value (e.g., a transmission state is good). However, while the first device 210 and the second device 230 or the first device 210 and the electronic device 101 are far from each other, the signal strength may be less than or equal to the signal threshold value (e.g., a transmission state is poor). The first device 210 and the second device 230 may share transmission environments with each other. Operation 1417 is identical or similar to operations 513 in FIG. 5, and thus, the detailed description thereof may be omitted.

In step 1419-1, the first device 210 determines a bit rate, based on the monitored transmission environment. When the transmission buffer state has a value that is less than or equal to a first threshold value or the signal strength exceeds a signal threshold value, the first device 210 may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the first device 210 may determine that the transmission environment corresponds to a weak electric field (e.g., a state in which the transmission environment is poor), and determine a second bit rate. The first bit rate may be greater than the second bit rate.

When the bit rate is determined, the first device 210 may determine a packet type, based on the determined bit rate.

In step 1419-2, the second device 230 determines a bit rate, based on the monitored transmission environment. When the transmission buffer state has a value that is less than or equal to a first threshold value or the signal strength exceeds a signal threshold value, the second device 230 may determine that the transmission environment corresponds to a strong electric field (e.g., a state in which the transmission environment is good), and determine a first bit rate. However, when the transmission buffer state exceeds the first threshold value or the signal strength is less than or equal to the signal threshold value, the second device 230 may determine that the transmission environment corresponds to a weak electric field (e.g., a state in which the transmission environment is poor), and determine a second bit rate. The first bit rate may be greater than the second bit rate.

When the bit rate is determined, the second device 230 may determine a packet type, based on the determined bit rate.

Steps 1419-1 and 1419-2 may be performed simultaneously or at the similar time points.

In step 1421-1, the first device 210 encodes the audio (e.g., a microphone input signal) acquired through the first microphone. The first device 210 may encode the microphone input signal at the determined bit rate. The first device 210 may synchronize a microphone input with that of the second device 230 through the second communication link 403. The synchronized microphone input signal may be encoded through an audio encoder of the first device 210, and for audio data encoded at the same time point, the first device 210 may assign the same index number (or index value) as that of the second device 230. The index number may be positioned within the encoded audio data (or bitstream), or may be included in a header of the transmitted audio packet.

In step 1421-2, the second device 230 encodes the audio acquired through the second microphone. The second device 230 may encode the microphone input signal at the determined bit rate. The second device 230 may synchronize a microphone input with that of the first device 210 through the second communication link 403. The synchronized microphone input signal may be encoded through an audio encoder of the second device 230, and for audio data encoded at the same time point, the second device 230 may assign the same index number (or index value) as that of the first device 210. The index number may be positioned within the encoded audio data (or bitstream), or may be included in a header of the transmitted audio packet.

Steps 1421-1 and 1421-2 may be performed simultaneously, or at similar time points.

In step 1423-1, the first device 210 stores the encoded audio data in a first memory. The storing of the audio data in the first memory may include temporary storage in an output buffer before transmitting the same to the electronic device 101. The audio data output from the output buffer of the first device 210 may be referred to as "first audio data", a "first audio bitstream", or a "first audio packet".

In step 1423-2, the second device 230 stores the encoded audio data in a second memory. The storing of the audio data in the second memory may include temporary storage in an output buffer before transmitting the same to the electronic device 101. The audio data output from the output buffer of the second device 230 may be referred to as "second audio data", a "second audio bitstream", or a "second audio packet".

Steps 1423-1 and 1423-2 may be performed simultaneously, or at similar time points.

In step 1425, the first device 210 transmits first audio data to the electronic device 101 through the first communication link 401. In the independent link scheme of FIG. 4C, the second device 230 can communicate with the electronic device 101, and thus, the first device 210 only transmits its own first audio data to the electronic device 101. The first device 210 may include an index number in the first audio data acquired from the first microphone at the same time point at which the second device 230 acquires audio data, and may transmit the same to the electronic device 101.

In step 1427, the second device 230 transmits second audio data to the electronic device 101 through the third communication link 405. The second device 230 may include an index number in the second audio data acquired from the second microphone at the same time point at which the first device 210 acquires audio data, and transmit the same to the electronic device 101.

Although FIG. 14 illustrates step 1425 preceding step 1427, according to a transmission environment of the first device 210 or the second device 230, step 1427 may precede step 1425, or steps 1425 and 1427 may be simultaneously performed.

In in step 1429, the electronic device 101 synchronizes audio data. For example, the electronic device 101 may receive the first audio data from the first device 210 through the first communication link 401 and receive the second audio data from the second device 230 through the third communication link 405. The electronic device 101 may synchronize the received first audio data and second audio data. The electronic device 101 may synchronize the first audio data with the second audio data, based on an index number included in each of the first audio data and the second audio data. Alternatively, the electronic device 101 may synchronize the first audio data with the second audio data, based on a sequence number included in a Bluetooth™ packet. The electronic device 101 may decode the first audio data and the second audio data through an audio decoder and generate a stereo audio signal. An input of the audio decoder may correspond to bitstreams encoded by the first device 210 and the second device 230 at the same time point through synchronization adjustment. The generated stereo audio signal may be processed and stored in a memory, and/or output through a speaker.

Figure 15:
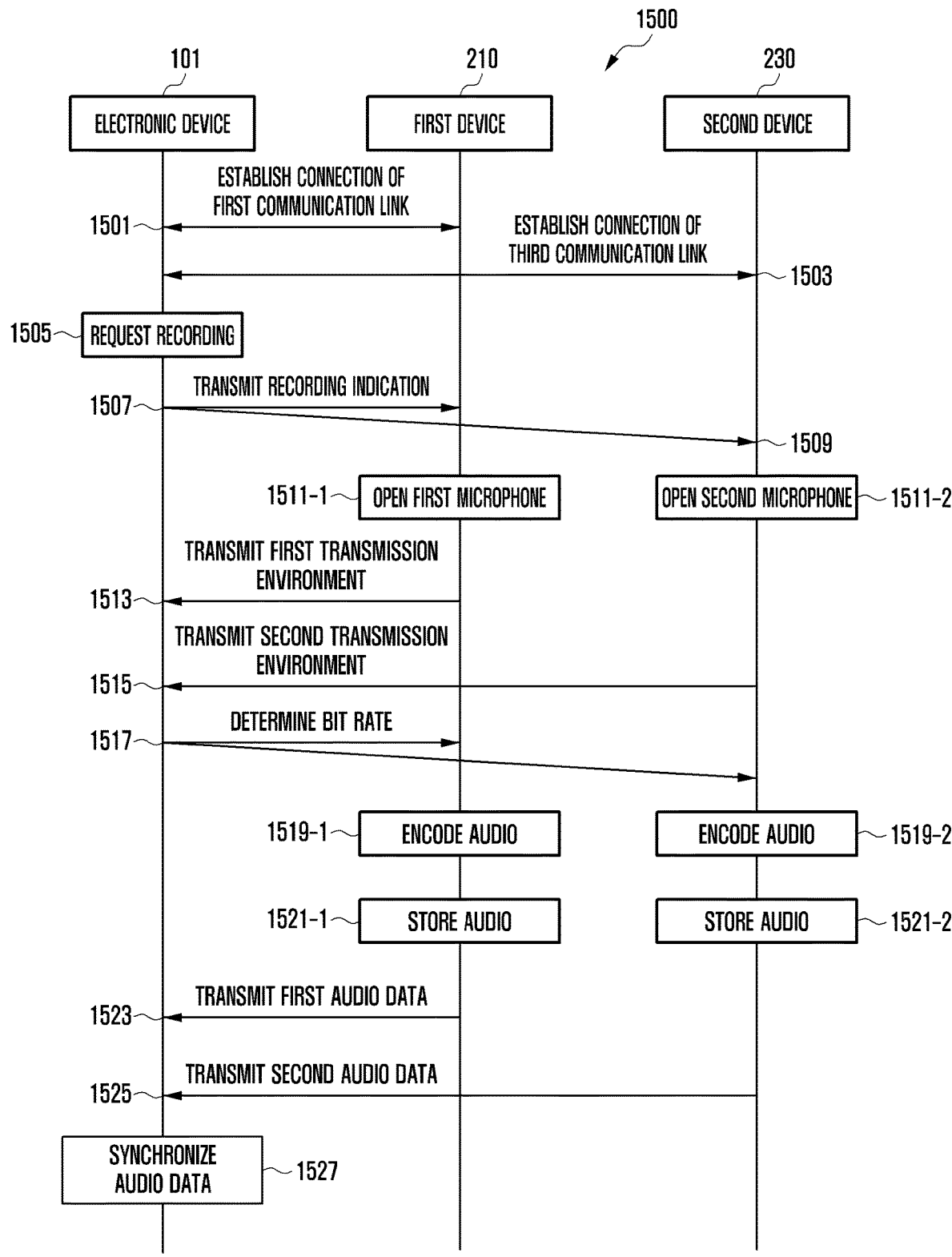
FIG. 15 is a signal flow diagram illustrating operations between an electronic device and a wearable device according to an embodiment.

FIG. 15 is a signal flow diagram illustrating operations between an electronic device and a wearable device according to an embodiment. For example, FIG. 15 will be described below with reference to the electronic device 101 and the wearable device including the first device 210 and the second device 230 as illustrated in FIG. 4D.

Referring to FIG. 15, in step 1501, the electronic device 101 establishes (or forms) a first communication link (e.g., the first communication link 401) with the first device 210. The first communication link 401 may include short-range wireless communication such as Bluetooth™ or BLE.

In step 1503, the electronic device 101 establishes (or forms) a third communication link (e.g., the third communication link 405) with the second device 230. The third communication link 405 and the first communication link 401 may have the same or similar communication scheme.

Although FIG. 15 illustrates step 1501 preceding step 1503, step 1503 may precede step 1501, or steps 1501 and 1503 may be simultaneously performed.

In step 1505, the electronic device 101 receives a recording request from a user. For example, when a user input of executing an application for recording and selecting (or pressing) a recording button is received, the electronic device 101 may determine that the recording request has been received.

In step 1507, the electronic device 101 transmits a recording indication (or a microphone open indication) to the first device 210 based on the recording request. The electronic device 101 may transmit a recording indication to the first device 210 through the first communication link 401. The first device 210 may operate (or open) a microphone based the recording indication to acquire audio. For example, the first device 210 may operate the microphone after a predetermined time has elapsed since receiving the recording indication.

In step 1509, the electronic device 101 transmits the recording indication to the second device 230 based on the recording request. The electronic device 101 may transmit the recording indication to the second device 230 through the third communication link 405. The second device 230 may operate (or open) the microphone based on the recording indication to acquire audio.

Although FIG. 15 illustrates step 1507 preceding step 1509, steps 1507 and 1509 may be simultaneously performed, or step 1509 may precede step 1507.

In step 1511-1, the first device 210 opens (or operates) a first microphone. The first device 210 may receive the microphone open indication, operate the first microphone after a predetermined time, and acquire audio at the same time point as the second device 230. The first device 210 may acquire (or receive) the audio through the first microphone.

In step 1511-2, the second device 230 opens (or operates) a second microphone. The second device 230 may receive the microphone open indication, operate the second microphone after a predetermined time, and acquire the audio at the same time point as the first device 210. The second device 230 may acquire (or receive) the audio through the second microphone.

Steps 1511-1 and 1511-2 may be simultaneously performed.

In step 1513, the first device 210 transmits a first transmission environment to the electronic device 101. The first transmission environment may include a transmission buffer state or a signal strength of the first device 210. For example, the transmission buffer state may include a current residual buffer space of a controller transmission buffer of the first device 210. The signal strength may include a signal strength (e.g., an RSSI) measured by the first device 210.

In step 1515, the second device 230 transmits a second transmission environment to the electronic device 101. The second transmission environment may include a transmission buffer state or a signal strength of the second device 230. The transmission buffer state may include a current residual buffer space of a controller transmission buffer of the second device 230. The signal strength may mean a signal strength (e.g., an RSSI) measured by the second device 230.

In step 1517, the electronic device 101 determines a bit rate, based on the first transmission environment and the second transmission environment. When the transmission buffer state of the first device 210 or the second device 230 has a value that is less than or equal to a first threshold value or the signal strength exceeds a signal threshold value, the electronic device 101 may determine that the transmission environment corresponds to a strong electric field (e.g., a state in which the transmission environment is good), and determine a first bit rate. However, when the transmission buffer state of the first device 210 or the second device 230 exceeds the first threshold value or the signal strength is less than or equal to the signal threshold value, the electronic device 101 may determine that the transmission environment corresponds to a weak electric field (e.g., a state in which the transmission environment is poor), and determine a second bit rate. The first bit rate may be greater than the second bit rate.

When the bit rate is determined, the electronic device 101 may determine a packet type, based on the determined bit rate. The electronic device 101 may transmit the determined bit rate to the first device 210 and the second device 230.

When the first device 210 and the second device 230 have different transmission environments, a bit rate may be determined based on a device having a poor transmission environment. For example, when each of the transmission environments of the first device 210 and the second device 230 has a value that is less than or equal to a first threshold value or the signal strength exceeds a signal threshold, the electronic device 101 may determine a first bit rate. When each of the transmission environments of the first device 210 and the second device 230 has a value exceeding the first threshold value or the signal strength is less than or equal to the signal threshold, the electronic device 101 may determine a second bit rate. However, when the transmission buffer state of one of the first device 210 and the second device 230 has a value exceeding the first threshold value or the signal strength is less than or equal to the signal threshold value, the electronic device 101 may determine a second bit rate.

In step 1519-1, the first device 210 encodes the audio (e.g., a microphone input signal) acquired through the first microphone. The first device 210 may encode the microphone input signal at the determined bit rate. The microphone input signal may be encoded through an audio encoder of the first device 210, and for audio data encoded at the same time point at which audio data is encoded by the second device 230, the first device 210 may assign the same index number (or index value) as that of the second device 230. The index number may be positioned within the encoded audio data (or bitstream), or may be included in a header of the transmitted audio packet.

In step 1519-2, the second device 230 encodes the audio acquired through the second microphone. The second device 230 may encode the microphone input signal at the determined bit rate. The microphone input signal may be encoded through an audio encoder of the second device 230, and for audio data encoded at the same time point at which audio data is encoded by the first device 210, the second device 230 may assign the same index number (or index value) as that of the first device 210. The index number may be positioned within the encoded audio data (or bitstream), or may be included in a header of the transmitted audio packet.

Steps 1519-1 and 1519-2 may be performed simultaneously, or at similar time points.

In step 1521-1, the first device 210 stores the encoded audio data in a first memory. The storing of the audio data in the first memory may include temporary storage in an output buffer before transmitting the same to the electronic device 101. The audio data output from the output buffer of the first device 210 may be referred to as "first audio data", a "first audio bitstream", or a "first audio packet".

In step 1521-2, the second device 230 stores the encoded audio data in a second memory. The storing of the audio data in the second memory may include temporary storage in an output buffer before transmitting the same to the electronic device 101. The audio data output from the output buffer of the second device 230 may be referred to as "second audio data", a "second audio bitstream", or a "second audio packet".

Steps 1521-1 and 1521-2 may be performed simultaneously, or at similar time points.

In step 1523, the first device 210 transmits first audio data to the electronic device 101 through the first communication link 401. In the independent link scheme of FIG. 4D, because the second device 230 can communicate directly with the electronic device 101, the first device 210 may transmit its own first audio data to the electronic device 101. The first device 210 may include an index number in the first audio data acquired from the first microphone at the same time point at which the second device 230 acquires audio data, and transmit the same to the electronic device 101.

In step 1523, the second device 230 transmits second audio data to the electronic device 101 through the third communication link 405. The second device 230 may include an index number in the second audio data acquired from the second microphone at the same time point at which the first device 210 acquires audio data, and transmit the same to the electronic device 101.

Although FIG. 15 illustrates step 1523 preceding step 1525, according to a transmission environment of the first device 210 or the second device 230, step 1525 may precede step 1523, or steps 1523 and 1525 may be simultaneously performed.

In step 1527, the electronic device 101 synchronizes audio data. For example, the electronic device 101 may receive the first audio data from the first device 210 through the first communication link 401 and may receive the second audio data from the second device 230 through the third communication link 405. The electronic device 101 may synchronize the received first audio data and second audio data. The electronic device 101 may synchronize the first audio data with the second audio data, based on an index number included in each of the first audio data and the second audio data.

The electronic device 101 may synchronize the first audio data with the second audio data, based on a sequence number included in a Bluetooth™ packet. The electronic device 101 may decode the first audio data and the second audio data through an audio decoder and generate a stereo audio signal. An input of the audio decoder may correspond to bitstreams encoded by the first device 210 and the second device 230 at the same time point through synchronization adjustment. The generated stereo audio signal may be processed and stored in a memory, and/or output through a speaker.

Figure 16A:
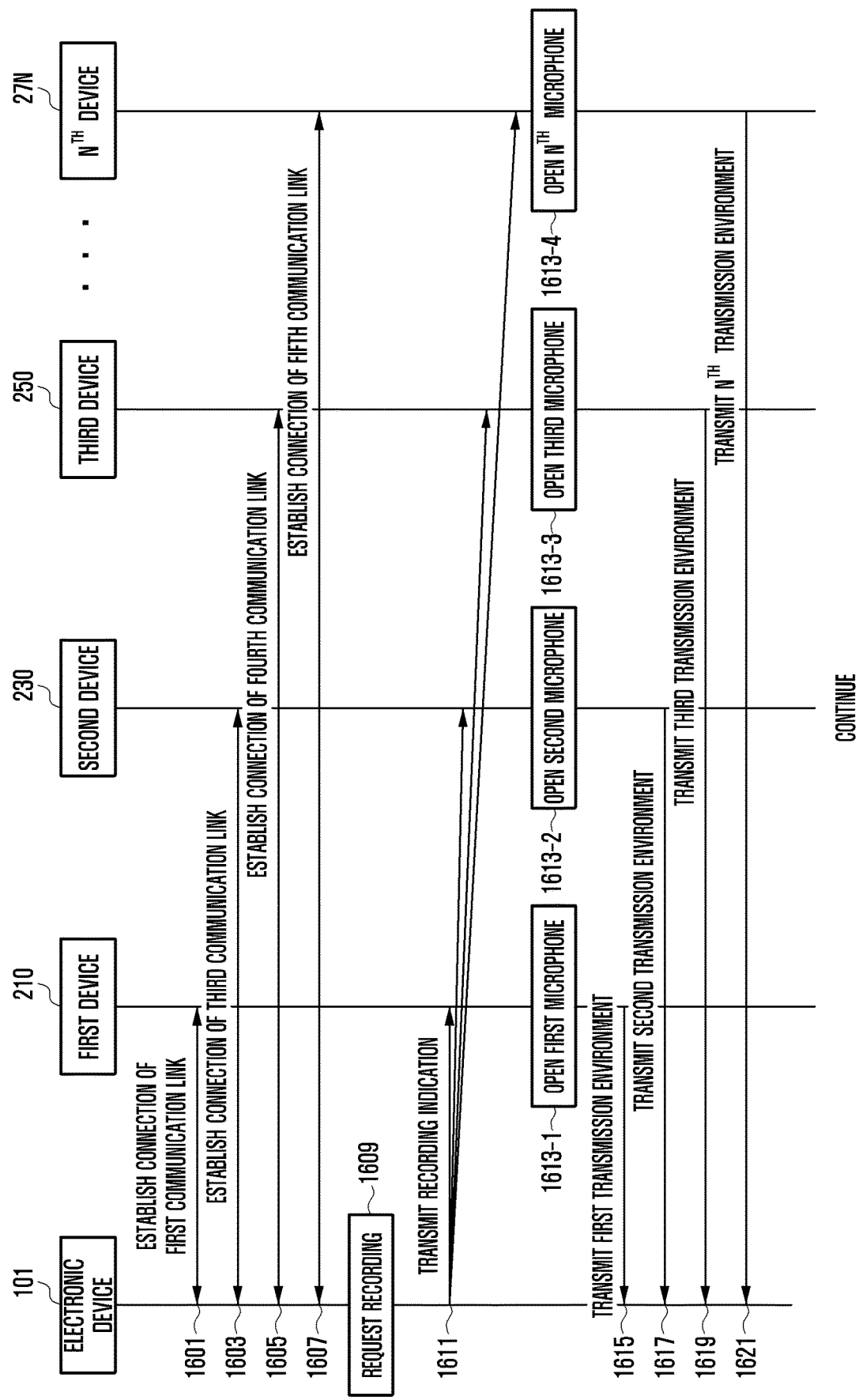
FIGS. 16A and 16B are signal flow diagrams illustrating operations between an electronic device and a wearable device according to an embodiment.
Figure 16B:
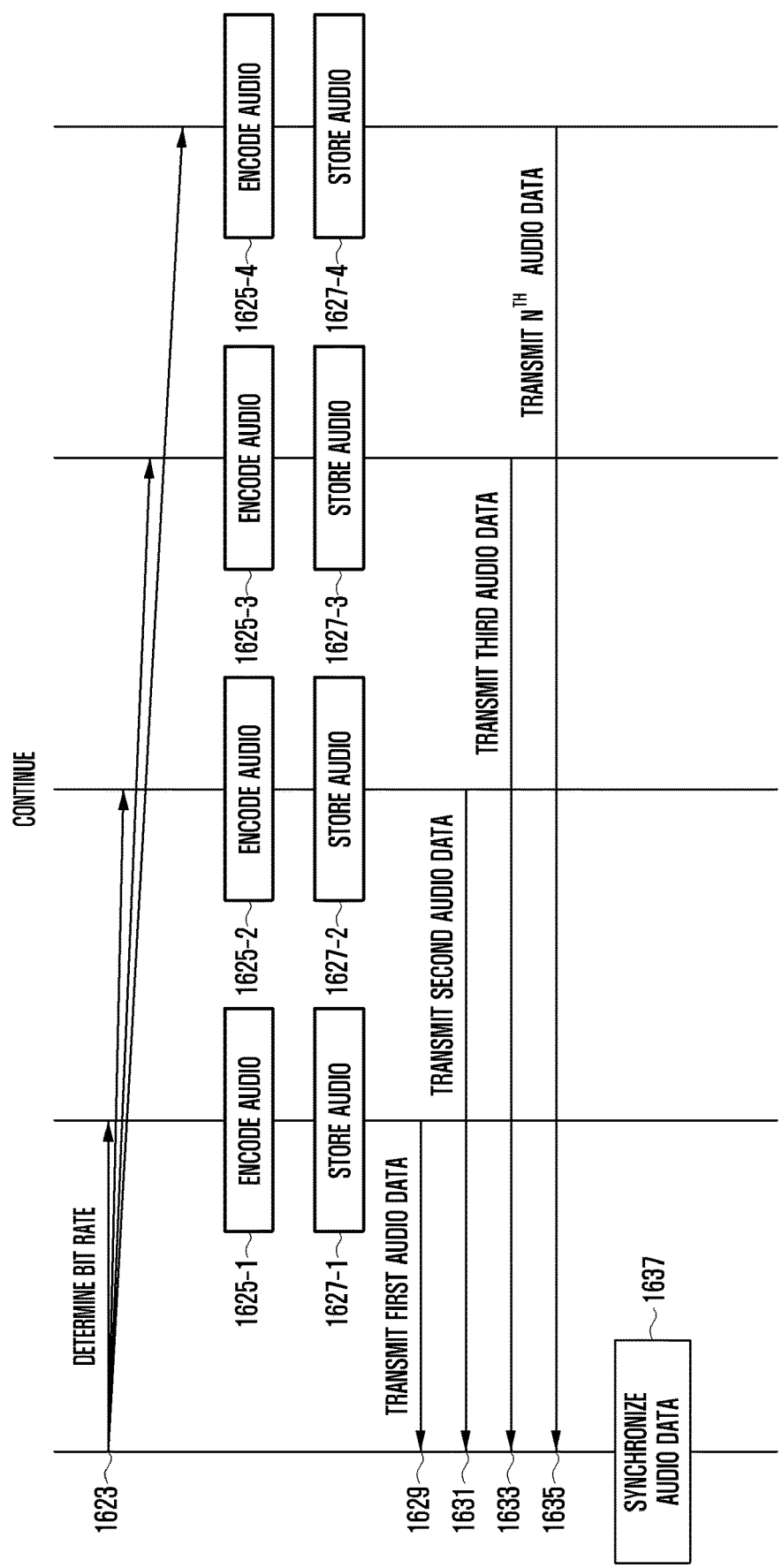

FIGS. 16A and 16B are signal flow diagrams illustrating operations between an electronic device and a wearable device according to an embodiment. For example, FIGS. 16A and 16B will be described below with reference to the electronic device 101, the wearable device including the first device 210 and the second device 230, a third device 270, and an $n^{th}$ device 27N as illustrated in FIG. 4D.

Referring to FIGS. 16A and 16B, in step 1601, the electronic device 101 establishes (or forms) a first communication link (e.g., the first communication link 401) with the first device 210. The first communication link 401 may correspond to short-range wireless communication such as Bluetooth™ or BLE.

In step 1603, the electronic device 101 establishes (or forms) a third communication link (e.g., the third communication link 405) with the second device 230. The third communication link 405 and the first communication link 401 may correspond to the same channel or the same communication scheme.

In step 1605, the electronic device 101 establishes (or forms) a fourth communication link (e.g., the fourth communication link 407) with the third device 270. The fourth communication link 407 and the first communication link 401 or the third communication link 405 may correspond to the same or similar communication scheme.

In step 1607, the electronic device 101 establishes (or forms) a fifth communication link (e.g., the fifth communication link 409) with the $n^{th}$ device 27N. The fifth communication link 409 and the first communication link 401, the third communication link 405, or the fourth communication link 407 may correspond to the same or similar communication scheme.

Although FIG. 16A illustrates steps 1601 to 1607 being sequentially performed, steps 1601 to 1607 may simultaneously performed, or may be performed in different orders.

In step 1609, the electronic device 101 receives a recording request from a user. For example, when a user input of executing an application for recording or selecting (or pressing) a recording button is received, the electronic device 101 may determine that the recording request has been received.

In step 1611, the electronic device 101 transmits a recording indication to the first 210 to $n^{th}$ devices 310 to 27N. The electronic device 101 may transmit the recording indication to the first device 210 through the first communication link 401, transmit the recording indication to the second device 230 through the third communication link 405, transmit the recording indication to the third device 270 through the fourth communication link 407, and transmit the recording indication to the $n^{th}$ device 27N through the firth communication link 409.

In step 1613-1, the first device 210 opens (or operates) a first microphone. The first device 210 may receive the recording indication, operate the first microphone after a predetermined time, and acquire audio. The first device 210 may acquire (or receive) the audio through the first microphone.

In step 1613-2, the second device 230 opens (or operates) a second microphone. The second device 230 may receive the recording indication, operate the second microphone after a predetermined time, and acquire audio. The second device 230 may acquire (or receive) the audio through the second microphone.

In step 1613-3, the third device 270 opens (or operates) a third microphone. The third microphone may be included in the third device 270. The third device 270 may receive the recording indication, operate the third microphone after a predetermined time, and acquire audio. The third device 370 may acquire (or receive) the audio through the third microphone.

In step 1613-4, the $n^{th}$ device 27N opens (or operates) an $n^{th}$ microphone. The $n^{th}$ microphone may be included in the $n^{th}$ device 27N. The $n^{th}$ device 27N may receive the recording indication, operate the $n^{th}$ microphone after a predetermined time, and acquire audio. The $n^{th}$ device 27N may acquire (or receive) the audio through the $n^{th}$ microphone.

Steps 1613-1 to 1613-4 may be simultaneously performed. The first to the $n^{th}$ devices 210 to 27N may acquire audio at the same time point.

In step 1615, the first device 210 transmits a first transmission environment to the electronic device 101. The first transmission environment may include a transmission buffer state or a signal strength of the first device 210. The transmission buffer state may include a current residual buffer space of a controller transmission buffer of the first device 210. The signal strength may include a signal strength (e.g., an RSSI) measured by the first device 210.

In step 1617, the second device 230 transmits a second transmission environment to the electronic device 101. The second transmission environment includes a transmission buffer state or a signal strength of the second device 230. The transmission buffer state may include a current residual buffer space of a controller transmission buffer of the second device 230. The signal strength may include a signal strength (e.g., an RSSI) measured by the second device 230.

In step 1619, the third device 270 transmits a third transmission environment to the electronic device 101. The third transmission environment may include a transmission buffer state or a signal strength of the third device 270. The transmission buffer state may include a current residual buffer space of a controller transmission buffer of the third device 270. The signal strength may include a signal strength (e.g., an RSSI) measured by the third device 270.

In step 1621, the $n^{th}$ device 27N transmits an $n^{th}$ transmission environment to the electronic device 101. The $n^{th}$ transmission environment may include a transmission buffer state or a signal strength of the $n^{th}$ device 27N. The transmission buffer state may include a current residual buffer space of a controller transmission buffer of the $n^{th}$ device 27N. The signal strength may include a signal strength (e.g., an RSSI) measured by the $n^{th}$ device 27N.

In step 1623, the electronic device 101 determines a bit rate, based on the first to the $n^{th}$ transmission environments. When the transmission buffer state of each of the first to the $n^{th}$ devices 210 to 27N has a value that is less than or equal to a first threshold value or the signal strength exceeds a signal threshold value, the electronic device 101 may determine that the transmission environment corresponds to a strong electric field (e.g., a state in which the transmission environment is good), and determine a first bit rate. However, when the transmission buffer state of each of the to the $n^{th}$ devices 210 to 27N exceeds the first threshold value or the signal strength is less than or equal to the signal threshold value, the electronic device 101 may determine that the transmission environment corresponds to a weak electric field (e.g., a state in which the transmission environment is poor), and determine a second bit rate. The first bit rate may be greater than the second bit rate.

When the bit rate is determined, the electronic device 101 may determine a packet type, based on the determined bit rate. The electronic device 101 may transmit the determined bit rate to the first to the $n^{th}$ devices 210 to 27N.

When the first to the $n^{th}$ devices 210 to 27N have different transmission environments, a bit rate may be determined based on a device having a poor transmission environment. For example, when each of the transmission environments of the first to the $n^{th}$ devices 210 to 27N has a value that is less than or equal to a first threshold value or the signal strength exceeds a signal threshold, the electronic device 101 may determine a first bit rate. When the transmission buffer state of one of the first to the $n^{th}$ devices 210 to 27N has a value exceeding the first threshold value or the signal strength is less than or equal to the signal threshold value, the electronic device 101 may determine a second bit rate.

In step 1625-1, the first device 210 encodes the audio (e.g., a microphone input signal) acquired through a first microphone. The first device 210 may encode the microphone input signal at the determined bit rate. The microphone input signal may be encoded through an audio encoder of the first device 210, and for audio data encoded at the same time point at which audio data encoded is by the second to the $n^{th}$ devices 230 to 27N, the first device 210 may assign the same index number (or index value) as that of the second to the $n^{th}$ devices 230 to 27N. The index number may be positioned within the encoded audio data (or bitstream), or may be included in a header of the transmitted audio packet.

In step 1625-2, the second device 230 encodes the audio acquired through a second microphone. The second device 230 may encode the microphone input signal at the determined bit rate. The microphone input signal may be encoded through an audio encoder of the second device 230, and for audio data encoded at the same time point at which audio data is encoded by the first device 210, the third device 270, and the $n^{th}$ device 27N, the second device 230 may assign the same index number (or index value) as that of the first device 210, the third device 270, and the $n^{th}$ device 27N. The index number may be positioned within the encoded audio data (or bitstream), or may be included in a header of the transmitted audio packet.

In step 1625-3, the third device 270 encodes the audio acquired through a third microphone. The third device 270 may encode the microphone input signal at the determined bit rate. The microphone input signal may be encoded through an audio encoder of the third device 270, and for audio data encoded at the same time point at which audio data is encoded by the first device 210, the second device 230, and the n'h device 27N, the third device 270 may assign the same index number (or index value) as that of the first device 210, the second device 230, and the $n^{th}$ device 27N. The index number may be positioned within the encoded audio data (or bitstream), or may be included in a header of the transmitted audio packet.

In step 1625-4, the $n^{th}$ device 27N encodes the audio acquired through an $n^{th}$ microphone. The $n^{th}$ device 27N may encode the microphone input signal at the determined bit rate. The microphone input signal may be encoded through an audio encoder of the $n^{th}$ device 27N, and for audio data encoded at the same time point at which audio data is encoded by the other devices, the $n^{th}$ device 27N may assign the same index number (or index value) as that of the other devices. The index number may be positioned within the encoded audio data (or bitstream), or may be included in a header of the transmitted audio packet.

Steps 1625-1 to 1625-4 may be performed simultaneously, or at similar time points.

In step 1627-1, the first device 210 stores the encoded audio data in a first memory. The storing of the audio data in the first memory may include temporary storage in an output buffer before transmitting the same to the electronic device 101. The audio data output from the output buffer of the first device 210 may be referred to as "first audio data", a "first audio bitstream", or a "first audio packet".

In step 1627-2, the second device 230 stores the encoded audio data in a second memory. The storing of the audio data in the second memory may include temporary storage in an output buffer before transmitting the same to the electronic device 101. The audio data output from the output buffer of the second device 230 may be referred to as "second audio data", a "second audio bitstream", or a "second audio packet".

In step 1627-3, the third device 270 stores the encoded audio data in a third memory. The storing of the audio data in the third memory may include temporary storage in an output buffer before transmitting the same to the electronic device 101. The audio data output from the output buffer of the third device 270 may be referred to as "third audio data", a "third audio bitstream", or a "third audio packet".

In step 1627-4, the $n^{th}$ device 27N stores the encoded audio data in an $n^{th}$ memory. The storing of the audio data in the $n^{th}$ memory may include temporary storage in an output buffer before transmitting the same to the electronic device 101. The audio data output from the output buffer of the $n^{th}$ device 27N may be referred to as "$n^{th}$ audio data", a "$n^{th}$ audio bitstream", or a "$n^{th}$ audio packet".

In order to distinguish among the audio data acquired and encoded by the first device 210, the audio data acquired and encoded by the second device 230, the audio data acquired and encoded by the third device 270, and the audio data acquired and encoded by the $n^{th}$ device 27N, "first", "second", "third", and "$n^{th}$" may be indicated.

Steps 1627-1 to 1627-4 may be performed simultaneously, or at similar time points.

In step 1629, the first device 210 transmits first audio data to the electronic device 101 through the first communication link 401. In the independent link scheme of FIG. 4D, because the second to the $n^{th}$ devices 230 to 27N can communicate directly with the electronic device 101, the first device 210 may transmit only its own first audio data to the electronic device 101. The first device 210 may include an index number in the first audio data acquired from the first microphone at the same time point at which the other devices acquire audio data, and transmit the same to the electronic device 101.

In step 1631, the second device 230 transmits second audio data to the electronic device 101 through the third communication link 405. The second device 230 may include an index number in the second audio data acquired from the second microphone at the same time point at which the other devices acquire audio data, and transmit the same to the electronic device 101.

In step 1633, the third device 270 transmits third audio data to the electronic device 101 through the fourth communication link 407. The third device 270 may include an index number in the third audio data acquired from the third microphone at the same time point at which the other devices acquire audio data, and transmit the same to the electronic device 101.

In step 1635, the $n^{th}$ device 27N transmits $n^{th}$ audio data to the electronic device 101 through the fifth communication link 409. The $n^{th}$ device 27N may include an index number in the $n^{th}$ audio data acquired from the $n^{th}$ microphone at the same time point at which the other devices acquire audio data, and transmit the same to the electronic device 101.

Although FIG. 16B illustrates steps 1629 to 1635 being performed sequentially, according to transmission environments of the first to the $n^{th}$ devices 210 to 27N, steps 1629 to 1635 may be simultaneously performed, or performed in different orders.

In step 1637, the electronic device 101 synchronizes audio data. For example, the electronic device 101 may receive the first audio data from the first device 210 through the first communication link 401, receive the second audio data from the second device 230 through the third communication link 405, receive the third audio data from the third device 270 through the fourth communication link 407, and receive the fifth audio data from the $n^{th}$ device 27N through the fifth communication link 409. The electronic device 101 may synchronize all of the received audio data, based on the index numbers included therein.

Alternatively, the electronic device 101 may synchronize the received audio data, based on a sequence number included in a Bluetooth™ packet. The electronic device 101 may decode the received audio data through an audio decoder and generate a stereo audio signal. An input of the audio decoder may correspond to bitstreams encoded by the first to the $n^{th}$ devices 210 to 27N at the same time point through synchronization adjustment. The generated stereo audio signal may be processed and stored in a memory, and/or output through a speaker.

Although the various embodiments of the disclosure described and shown in the specification and the drawings have presented specific examples in order to easily explain the technical contents of the disclosure and help understanding of the disclosure, these are not intended to limit the scope of the disclosure. Therefore, the scope of the disclosure should be construed to include, in addition to the embodiments disclosed herein, all changes and modifications that are derived based on the technical idea of the disclosure.

In accordance with the above-described embodiments, a bit rate of audio data acquired from each of a first device and a second device can be variably adjusted according to a transmission environment between an electronic device and a wearable device including the first device and the second device.

Further, when a transmission environment corresponds to a strong electric field situation (e.g., a good situation), audio data is encoded by using a higher bit rate, and when a transmission environment corresponds to a weak electric field situation (e.g., a poor situation), the bit rate is reduced, so that packet transmission can be smoothly performed.

A bit rate can be variably adjusted according to a transmission environment instead of the existing method of using a fixed bit rate regardless of the change in the transmission environment, and thus, sound cutoff can be minimized and a high-quality recording service can be provided.

Additionally, the same index number may be assigned to audio data acquired at the same time point from each of the devices, and the synchronization is matched between audio data acquired from each of the devices, based on the index number, and thus, a high-quality recording service can be provided.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:
1. An electronic device, comprising:
a microphone;
a communication module;
a processor; and
memory storing instructions that, when executed by the processor, cause the electronic device to:
establish a first communication link with a first external electronic device through the communication module,
establish a second communication link with a second external electronic device through the communication module,
acquire audio data from the microphone based on receiving a recording request from the first external electronic device,
identify a transmission environment based on a transmission buffer state of the first external electronic device or the second external electronic device,
determine a bit rate of the audio data based on the transmission environment, encode the audio data based on the determined bit rate, and transmit the encoded audio data to the first external electronic device, wherein the processor is further configured to:

acquire first audio data from the encoded audio data, receive second audio data from the second external electronic device through the second communication link, and synchronize the first audio data with the second audio data to transmit the synchronized audio data to the first external electronic device through the first communication link.

2. The electronic device of claim 1, wherein the processor is further configured to:

exchange a signal strength or the transmission buffer state with the second external electronic device, and identify the transmission environment, based on the transmission buffer state or the signal strength.

3. The electronic device of claim 2, wherein the processor is further configured to:

determine a first bit rate when the transmission buffer state has a value that is less than or equal to a first threshold value or the signal strength exceeds a signal threshold value, and determine a second bit rate that is lower than the first bit rate when the transmission buffer state has a value exceeding the first threshold value or the signal strength is less than or equal to the signal threshold value.

4. The electronic device of claim 1, wherein the processor is further configured to assign a same index number as that of the second external electronic device to audio data acquired at a same time point at which the second external electronic device acquires the audio data.

5. The electronic device of claim 1, wherein the processor is further configured to synchronize the first audio data with the second audio data, based on an index number included in each of the first audio data and the second audio data.

6. The electronic device of claim 1, wherein the processor is further configured to transmit information on the first communication link to the second external electronic device.

7. An electronic device, comprising:

a microphone;

a communication module;

a processor; and memory storing instructions that, when executed by the processor, cause the electronic device to:

establish, through the communication module, a second communication link with a second external electronic device connected to a first external electronic device through a first communication link, receive a microphone open command from the second external electronic device, operate the microphone to acquire audio data, identify a transmission environment based on a transmission buffer state of the second external electronic device, determine a bit rate of the audio data, based on the transmission environment, encode the audio data, based on the determined bit rate, and transmit the encoded audio data to the first external electronic device or the second external electronic device, wherein the processor is further configured to:

synchronize a microphone input signal of the second external electronic device, and assign a same index number as that of the second external electronic device to the audio data acquired at a same time point at which the second external electronic device acquires the audio data based on the synchronized microphone input signal.

8. The electronic device of claim 7, wherein the processor is further configured to:

exchange the transmission buffer state or a signal strength with the second external electronic device, and identify the transmission environment, based on the transmission buffer state or the signal strength.

9. The electronic device of claim 8, wherein the processor is further configured to:

determine a first bit rate when the transmission buffer state has a value that is less than or equal to a first threshold value or the signal strength exceeds a signal threshold value, and determine a second bit rate that is lower than the first bit rate when the transmission buffer state has a value exceeding the first threshold value or the signal strength is less than or equal to the signal threshold value.

10. The electronic device of claim 7, wherein the processor is further configured to assign a same index number as that of the second external electronic device to audio acquired at a same time point at which the second external electronic device acquires the audio.

11. The electronic device of claim 7, wherein the processor is further configured to transmit the encoded audio data to the second external electronic device through the second communication link.

12. The electronic device of claim 7, wherein the processor is further configured to:

receive information on the first communication link from the second external electronic device through the second communication link, and establish the first communication link with the first external electronic device, based on the information on the first communication link.

13. The electronic device of claim 12, wherein the processor is further configured to transmit the encoded audio data to the first external electronic device through the first communication link.

* * * * *